US006981223B2

(12) United States Patent
Becker et al.

(10) Patent No.: US 6,981,223 B2
(45) Date of Patent: Dec. 27, 2005

(54) METHOD, APPARATUS AND COMPUTER READABLE MEDIUM FOR MULTIPLE MESSAGING SESSION MANAGEMENT WITH A GRAPHICAL USER INTERFACE

(75) Inventors: Michael Becker, San Jose, CA (US); Krishnakumar Narayanan, Cupertino, CA (US)

(73) Assignee: ecrio, inc., Cupertino, CA (US)

( * ) Notice: Subject to any disclaimer, the term of this patent is extended or adjusted under 35 U.S.C. 154(b) by 514 days.

(21) Appl. No.: 10/052,087

(22) Filed: Jan. 17, 2002

(65) Prior Publication Data

US 2002/0130904 A1   Sep. 19, 2002

Related U.S. Application Data

(60) Provisional application No. 60/277,415, filed on Mar. 19, 2001.

(51) Int. Cl.[7] .............................. G06F 3/00; G06F 9/00; G06F 17/00
(52) U.S. Cl. ........................ 715/753; 715/772; 715/777
(58) Field of Search .............................. 709/204, 205, 709/206, 207; 715/758, 755, 751, 783, 804, 715/752, 777, 759, 753, 767, 772, 776, 778, 715/779, 793, 790, 794, 802, 803

(56) References Cited

U.S. PATENT DOCUMENTS

| | | | | |
|---|---|---|---|---|
| 6,049,812 | A * | 4/2000 | Bertram et al. | 715/516 |
| 6,166,736 | A * | 12/2000 | Hugh | 715/798 |
| 6,339,784 | B1 * | 1/2002 | Morris et al. | 709/204 |
| 6,404,443 | B1 * | 6/2002 | Westerman | 715/776 |
| 6,539,421 | B1 * | 3/2003 | Appelman et al. | 709/206 |
| 6,754,904 | B1 * | 6/2004 | Cooper et al. | 725/32 |

OTHER PUBLICATIONS

AOL screenshot, 3 pages, file dated Feb. 19, 2001, publication date unknown.
Babbler screenshot, 1 page, file dated Feb. 19, 2001, publication date unknown.
Bantu screenshot, 1 page, file dated Feb. 19, 2001, publication date unknown.
CNET Internet, Fast Talkers: CNET Review the Top Instant Messengers, www.cnet.com/internet/0-4023-7-1591649.hrml?st.int.4023-7-1595213-rost . . . , 12 pages, printed Feb. 22, 2001.
Emphatech screenshot, 2 pages, file dated Feb. 19, 2001, publication date unknown.
ICQ screenshot, 2 pages, file dated Feb. 19, 2001, publication date unknown.

(Continued)

Primary Examiner—John Cabeca
Assistant Examiner—Blaine Basom
(74) Attorney, Agent, or Firm—Altera Law Group, LLC

(57) ABSTRACT

A graphical user interface displays a unique graphical indexing element such as a tab for each engaged and non-engaged messaging session. The user chooses which messaging session to make engaged by selecting its graphical indexing element. The graphical indexing elements have various distinctive characteristics to indicate the status of their respective messaging sessions, such as engaged, non-engaged with no unread messages, or non-engaged with at least one unread message. The messaging sessions may all be docked, in which event the engaged messaging session is displayed in a window pane set and the other messaging sessions are not displayed, or may be selectively undocked, in which event the engaged messaging session and the undocked messaging sessions are displayed in respective window pane sets. The engaged window pane set supports the communication of original or predefined messages between the user's digital device and the pal's messaging-enabled digital device, regardless of capability.

2 Claims, 18 Drawing Sheets

OTHER PUBLICATIONS iPulse screenshot, 1 page, file dated Feb. 19, 2001, publication date unknown.

Jmessenger screenshot, 1 page, file dated Feb. 19, 2001, publication date unknown.

MessageVine screenshot, 1 page, file dated Feb. 19, 2001, publication date unknown.

MSN screenshot, 2 pages, file dated Feb. 19, 2001, publication date unknown.

My Messenger screenshot, 1 page, filed dated Feb. 19, 2001, publication date unknown.

Odigo screenshot, 2 pages, file dated Feb. 19, 2001, publication date unknown.

Post-it screenshot, 1 page, file dated Feb. 19, 2001, publication date unknown.

Pow Wow (Tribal Voice) screenshot, 1 page, file dated Feb. 19, 2001, publication date unknown.

Trillian screenshots, 2 pages, file dated Jul. 26, 2001, publication date unknown.

Yahoo screenshot, 1 page, file dated Feb. 19, 2001, publication date unknown.

* cited by examiner

METHOD, APPARATUS AND COMPUTER READABLE MEDIUM FOR MULTIPLE MESSAGING SESSION MANAGEMENT WITH A GRAPHICAL USER INTERFACE

CROSS-REFERENCE TO RELATED APPLICATION

This application claims the benefit of U.S. Provisional Application No. 60/277,415, filed Mar. 19, 2001, which is hereby incorporated herein by reference in its entirety.

BACKGROUND OF THE INVENTION

1. Field of the Invention

The present invention relates to management of multiple messaging sessions, and more particularly to management of multiple messaging sessions between a user and various pals with a graphical user interface.

2. Description of Related Art

Messaging using various desktop and mobile messaging-enabled digital devices over networks has become commonplace. Messaging methods are varied and include voice messaging and various forms of electronic messaging such as paging, email, fax, instant message exchange, short message services ("SMS"), voice over internet protocol, conference, and chat. Recently, instant message exchange has become very popular. A number of companies offer various solutions for instant message exchange over networks such as the internet, including Yahoo! Inc., America Online, Inc., and Microsoft Corporation. Typically, these solutions facilitate the exchange of instant messages between the user of a client personal computer system and others, which are commonly referred to by such terms as "pals," "buddies," "friends," "contacts" or "strangers" and are generally referred to herein as "pals." These pals may be people or machines such as servers, the later commonly being referred to as "bots" instead of pals. A pal may also be a group of people or bots. Instant messages are exchanged essentially instantaneously, or in "real time," superseding the pace of many other messaging techniques.

Many of the well known solutions for instant message exchange over the internet are based on a client-server model. The clients are personal computers ("PCs"), personal digital assistants ("PDAs"), phones and browsers (including Microsoft® Internet Explorer and Netscape® Navigator). The applications running on these clients are implemented in a variety of software languages and with a variety of protocols, including the wireless access protocol ("WAP")™ protocol, short message service ("SMS"), hypertext markup language ("HTML"), JavaScript, Java applets, Brew™ script, J2ME script, and C, C++, or XML code sections. Many instant message exchange solutions work in conjunction with a server based host application over the internet network or wireless networks to carry out instant message exchange. The server component manages message traffic, delivery, and reporting, while the client component displays an instant message exchange window to shown the received message. Alternatively, some solutions, especially those for advanced types of communications devices, do not require a server based instant messaging host application for communications once a connection is made, and may use peer-to-peer communications instead. These solutions typically are implemented with a pre-installed or downloaded client application on, for example, a personal computer, which manages message traffic, delivery, and reporting.

Various distribution techniques for the various solutions are also well known. Client applications, including applications that support peer-to-peer messaging as well as browser plug-ins, may be preinstalled or in firmware, or made available in software form from computer-readable media, such as software loaded from storage media, including magnetic storage media such as diskette, tape and fixed disk, semiconductor storage media such as various types of flash memory cards, and optical storage media such as CD-ROM and DVD-ROM, and software downloaded from distribution media such as networks, including wired and wireless networks, local and wide area networks, and the Internet. Scripts and short code segments furnished to general purpose browsers typically are downloaded from a network.

A typical feature of the various instant message exchange solutions is keeping track of and visually indicating whether the user's authorized pals are online or offline. Instant messages may be sent to and received from any of the user's pals who are online. Other typical features include management of the various pals, including the grouping of individual pals, the addition and deletion of pals, and the setting of privacy options; multiparty real time chats with pals; and file exchange with pals. Some solutions alert the user when particular pals come online, provide for voice chat or even multiparty voice conference calls, offer instant message archiving, and permit sending instant messages to offline pals. Some solutions provide an electronic whiteboard which allows the user to draw images and type notes to share with others.

Typically, these solutions handle the exchange of instant messages between the user and multiple individual pals and pal groups by spawning multiple separate windows in a graphical user interface, which typically is formed in the display memory of the user's digital device and viewed by the user on a screen, which may be a monitor of a personal computer or the LED (light emitting diode) or TFT (thin film transistor) screen of a personal data assistant. Examples of such solutions for the personal computer include Bantu (www.bantu.com), Yahoo! (www.yahho.com), Jabber (www.jabber.com), AOL (www.aol.com), MSN (www.msn.com), Ipulse (www.oz.com), OMNI (www.Emphatech.com), Odigo (www.odigo.com), Babbler (www.babbler.com), ICQ (www.icq.com), POWWOW (legacy site at www.tribalvoice.com), NomadIQ (www.omnisky.com), Jmessenger (www.jmessenger.com), MessageVine (www.messagevine.com), and Paltalk (www.paltalk.com). A solution from Trillian (www.trillian.cc) also spawns multiple windows, all of which can be confined to one larger window or placed anywhere on the user's screen.

Some of these solutions, such as, for example, Bantu and PowWow, use tabs to organize and selectively display lists of pals and other information within a single window. Generally speaking, tabs are commonly used by many applications to organize and display lists of information, such as, for example, preferences in such programs as Microsoft Word.

Unfortunately, the use of multiple separate windows to handle the exchange of instant messages between a user and multiple individual pals and pal groups creates a cluttered appearance on the monitor of the user's computer which some users find distracting or inconvenient. Moreover, instant message exchange applications often are used while other programs are running. Some of these other programs may be communications programs that handle such messaging as facsimile and email. The display of instant message exchange windows over other communications program windows, which are likely to have a different look and feel and be based on conceptually different control and navigation techniques, only adds to the clutter and may confuse some users attempting to manage the multiple messaging sessions.

BRIEF SUMMARY OF THE INVENTION

Advantageously, one or more embodiments of the multiple messaging session management graphical user interface architecture of the present invention provides a graphical indexing element to facilitate the user's management of multiple messaging sessions.

Advantageously, one or more embodiments of the multiple messaging session management graphical user interface architecture of the present invention facilitates the user's management of multiple messaging sessions by providing for window pane sets that are selectively switchable between a docked state and an undocked state.

Advantageously, one or more embodiments of the multiple messaging session management architecture of the present invention facilitates the user's management of a multiple pal messaging session by providing for multiple pal selections for one-to-many or for many-to-many messaging.

These and other advantages are realized individually or collectively by one or more embodiments of the present invention. One embodiment of the present invention is a messaging-enabled digital device comprising a messaging facility, a user input facility, and a graphical user interface. The graphical user interface comprises a plurality of graphical indexing elements respectively representing a plurality of messaging sessions being handled by the messaging facility, one of the graphical indexing elements being selected in response to the user input facility and the messaging session represented by the selected graphical indexing element being engaged. The graphical user interface also comprises a message history window pane displaying information from the engaged messaging session, and a composition window pane displaying information for the engaged messaging session.

A further embodiment of the present invention is computer-readable medium carrying computer executable components for multiple messaging session management on a messaging-enabled digital device. The computer executable components comprise a messaging component, a user input component, a window pane component for displaying a plurality of graphical indexing elements respectively representing a plurality of messaging sessions handled by the messaging component, one of the graphical indexing elements being selected in response to the user input component and the messaging session represented by the selected graphical indexing element being engaged, a component for displaying a message history window pane containing information from the engaged messaging session, and a component for displaying a composition window pane containing information for the engaged messaging session.

Yet another embodiment of the present invention is a method of managing multiple messaging sessions graphically on a user's messaging-enabled digital device linked over one or more networks to other messaging-enabled digital devices in one or more environments such as peer-to-peer and client-server, the user's messaging-enabled digital device having a capability to receive input from a user and a capability to display information to the user. The method comprises displaying a pals list window pane to the user, displaying a plurality of graphical indexing elements respectively representing a plurality of messaging sessions to the user, detecting the user's selection of one of the graphical indexing elements in accordance with input from the user, designating the messaging session represented by the selected graphical indexing element as an engaged messaging session in response to the detecting step, displaying a message history window pane relating to the engaged messaging session using the display capability of the user's messaging-enabled digital device; and displaying a composition window pane relating to the engaged messaging session using the display capability of the user's messaging-enabled digital device.

Another embodiment of the present invention is a messaging-enabled digital device comprising means for establishing a plurality of messaging sessions, means for displaying a plurality of graphical indexing elements, the graphical indexing elements respectively representing the messaging sessions, means for selecting one of the graphical indexing elements in accordance with input from a user of the messaging-enables digital device to designate the messaging session represented by the selected graphical indexing element as an engaged messaging session, means for displaying a message history window pane relating to the engaged messaging session, and means for displaying a composition window pane relating to the engaged messaging session.

DETAILED DESCRIPTION OF THE INVENTION, INCLUDING THE BEST MODE

Figure 1:
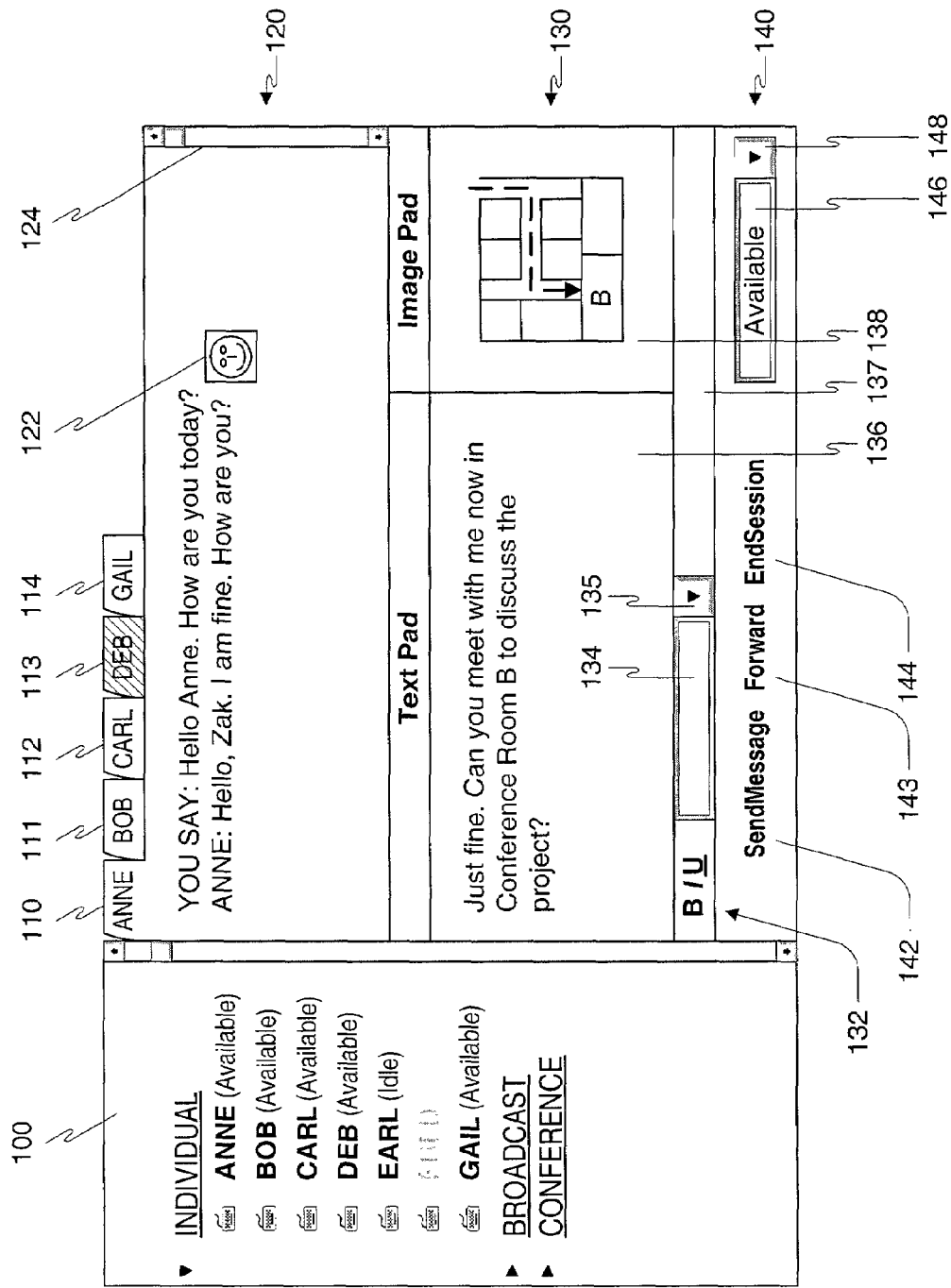
FIG. 1 is a pictorial representation of a graphical user interface having five individual sessions.

A graphical user interface is provided for a user's messaging enabled digital device to facilitate the management of multiple open, or current, messaging sessions, including instant messaging sessions of an individual, broadcast or conference nature. The graphical user interface displays a unique graphical indexing element such as a tab for each of the open messaging sessions. The user engages one of the messaging sessions preferably by selecting its graphical indexing element, and the engaged messaging session is displayed in a window pane set. Other techniques for engaging a messaging session include selecting the messaging session from a list such as a drop-down list or a pull-down list which can be invoked in any convenient manner, as with a keyboard command, from a button associated with the window pane set, from a toolbar associated with the window pane set, from right clicking a mouse with the cursor located in an unengaged window pane set, and so forth. Once a messaging session is engaged, the user can compose and send a message to the pal or pals that are part of the engaged messaging session. The graphical indexing elements have various distinctive characteristics to indicate the status of their respective messaging sessions, such as engaged, non-engaged with no unread messages, or non-engaged with at least one unread message. The engaged messaging session illustrative is displayed using a pals panel, a message history panel, and a composition panel. A session command bar may also be included. These components support the user's management of pals and the communication of a variety of original or predefined messages such as handwritten notes, drawings, images, pictures, animation, and other multimedia content, as well as a variety of application files such as word processing documents, spreadsheets, presentations, and so forth. All of the messaging sessions may be docked—displayed in one window pane set—or selectively undocked—displayed in multiple window pane sets. The engaged window pane set supports the communication of original or predefined messages between the user's digital device and the pal's messaging-enabled digital device, regardless of capability.

Messaging session management as described herein is useful in that it provides the user with flexibility and efficiency in managing multiple messaging sessions involving a variety of messaging-enabled digital devices, including, for example, various browsers such as Microsoft® Internet Explorer and Netscape® Navigator running on personal computers and workstations such as IBM-compatibles, Apple and Sun computers, and various PDAs running operating systems such as Palm OS®, Microsoft® Windows® CE/Pocket PC, Symbian EPOC™, Blackberry RIM™ wireless handhelds, future releases of enhanced WAP, I-Mode™, and SMS-enabled phones, set top boxes, smart televisions, internet appliances, and so forth. This description focuses on the example of a multiple messaging session management architecture used for instant message exchange with a browser running on a personal computer. However, the techniques described herein are also useful for many other types of messaging methods and many other types of client applications.

A messaging session may be a one-to-one messaging transaction (individual session) between the user and one other pal, a one-to-many messaging transaction (broadcast session) between the user and a number of other pals, or a many-to-many messaging transaction (conference session, including chat) between a number of pals including the user. To facilitate effective messaging session management, each messaging session is capable of being engaged or non-engaged but only one messaging session may be engaged at a time. When engaged, a messaging session is capable of being fully displayed to the user in a window pane set, which includes at least one pane but preferably a few panes dedicated to specific tasks. Multiple messaging sessions may be displayed in a docked configuration, in which each docked messaging session is associated with a unique graphical indexing element such as a session tab, placard, button, and so forth. Multiple messaging session management as described herein distinguishes between messaging sessions on the basis of their being engaged or non-engaged, but may also distinguish on additional basis, such as a session being non-engaged without any unread messages, or non-engaged with at least one unread message. The graphical indexing elements may have various distinctive characteristics to indicate the status of their respective messaging sessions, the distinctive characteristics preferably being visual but including other sensory stimuli such as sound or a combination of sensory stimuli. Multiple messaging session management provides the user with the ability to easily switch the engaged messaging session and display the newly designated engaged messaging session in a window pane set, to initiate or end messaging sessions, and forward and archive messaging sessions, all while containing the user's various messaging sessions either in one compact window pane set or in multiple window pane sets by spawning undocked window panes for all or selected ones of the user's messaging sessions.

An example of a graphical user interface having a multiple messaging session management architecture is shown in FIG. 1. The graphical user interface of FIG. 1 is consolidated into a single window pane set, which is achieved using a pals panel 100, a variable number of session tabs 110, 111, 112, 113, 114, a message history panel 120, and a composition panel 130. The panels 100, 120 and 130 may contain one or more additional features, such a, for example, labels, buttons, elevator controls, toolbars, and so forth. A session command bar 140 is also included in the graphical user interface of FIG. 1 to facilitate the issuance of commands and the designation of status. Consolidation of these various panels to achieve a single unified window pane set greatly facilitates the user's tasks, but if desired the panels may be spun off to create multiple spaced apart window pane sets.

The components 110, 120, 130 and 140 relate to an "engaged" messaging session that is represented by the session tab 110. However, FIG. 1 also represents a number of non-engaged messaging sessions, which are indicated by session tabs 111, 112, 113 and 114.

A session tab such as the session tab 110 is a unique identifier for one messaging session and is marked with the name of the messaging session. The messaging session name may be assigned in any convenient manner. In one illustrative way to assign a messaging session name, the session tab for a new individual session is automatically named with the nickname of the selected pal, while the session tab for a new broadcast or conference session is named manually by the user. The session tabs may be a fixed or variable size. If desired, the number of session tabs may be permitted to exceed the available width of the screen, in which event various techniques may be used to cope with this situation, including such well known techniques as horizontal scroll arrows and drop down boxes.

The session tabs also represent various states of the messaging sessions with which they are associated. Preferably, only one engaged messaging session exists at any time. In FIG. 1, the session tab 110 is the session tab for the engaged messaging session, while session tabs 111–114 are session tabs for non-engaged messaging sessions. The session tabs may be coded in some way to designate the state of their respective sessions. In the case of instant message exchange sessions, for example, a session may be engaged, non-engaged with no unread messages, non-engaged with at least one unread message, and non-engaged with at least one unread message having just been received. Any suitable coding technique may be used, including such well know coding techniques as color, texture, animation (including flashing), sound, icon, or some combination thereof. One example of session tab coding is to use blue to indicate the engaged messaging session, white to indicate all non-engaged messaging sessions which do not contain any unread message, red to indicate all non-engaged messaging sessions which contains at least one unread message, and flashing red to indicate a non-engaged messaging session that has just received a message. In FIG. 1, the session tab 113 is cross-hatched to depict a flashing appearance indicating the recent receipt of an instant message by the user's client application from Deb. The user may be given the option of selecting among a variety of different messaging session coding schemes or of defining a custom messaging session coding scheme.

The pals panel 100 displays a list of pals with which the user is exchanging or may exchange messages. Illustratively, the pals are listed under particular headings, but may alternatively be managed using tabs, menu items, buttons, or any other techniques suitable for selecting messaging modes. As illustratively shown in FIG. 1, the pals panel 100 contains three exemplary headings "INDIVIDUAL," "BROADCAST" AND "CONFERENCE," which provide the user the ability of communicating with pals on a individual, broadcast or conference basis respectively. A chat session may be considered a relatively unstructured and informal form of conference, the basic difference between conference and chat being confidentiality and control. In a chat session, typically the session is unrestricted and anyone can enter or be brought into the session. In a conference session, various levels of confidentiality and control (access control, content forwarding, participant ejection, and archival) may be established, which can be as lenient as chat or as restrictive as permitting only the conference session initiator to add or remove participants and archive or forward the session.

When selected by the user or in the context of some event, a heading expands to display the pals list. Illustratively, only one heading is expanded at a time, and all may be collapsed under some circumstances. FIG. 1 shows an "Individual" list in an expanded state, a "Broadcast" list in a collapsed state, and a "Conference" list in a collapsed state. It will be appreciated that the headings shown in FIG. 1 are exemplary, and that other headings such as user defined groups may be used or that headings may be dispensed with in favor of other techniques for selecting and displaying a pals list such as tabs, drop-down and pull-down lists, and so forth. Moreover, the use of a single panel for displaying multiple headings is exemplary, and multiple panels displaying respective pals lists may be used if desired.

A pals list is displayed in the pals panel 100 under whichever heading is selected. The type of pals displayed in the list is dependent on circumstances, and may be in accordance with the user's configuration of the list, determined by the nature of an event, or in accordance with the user's client application defaults. Examples of different pal lists include an unfiltered list (a complete list of all of the user's pals) and lists organized or limited in various ways such as sorted by a user specified field and/or limited by online and/or offline status, the pal's location, the pal's device presence, the pal's availability, special interest groups, family groups, work groups, and so forth. The pals list shown in the pals panel 100 of FIG. 1 is configured, for example, to show all pals having a browser suitable for instant message exchange, regardless of online status or availability status. Seven pals are shown. Six of the pals, namely Anne, Bob, Carl, Deb, Earl and Gail, are online, as indicated by the bold black font (although any distinctive font, color, icon, and so forth may be used to so indicate). One of the pals, namely Fred, is offline, as indicated by the gray font (although any distinctive font, color, icon, and so forth may be used to so indicate).

A stranger is different from other pals in that preferably a stranger is not included on any pals list. Even so, messaging is not limited to pals listed on a pals list. Communications are provided for between the user and strangers, that is, those who are within the user's messaging network but who are not on the user's pals list. A stranger's name may be shown in the graphical user interface using the stranger's identification within the network, which may be a name supplied by the stranger, automatically generated, or generated in any other suitable manner. Typically, communication is initiated by the stranger, but a user may also initiate communication with a stranger.

Illustratively, each pal is represented by a single line that contains the pal's name, a "device presence" icon to the left of the name, and an "availability" code to the right of the name. More, less or different information may be included for each pal, and multiple lines may be used for each pal if desired. For example, a pal's location may also be displayed next to the pal's availability or toggled with availability. An icon may also be used to indicate interoperability for instant message exchange, in lieu of or along with a notification message. For example, if the pal's device cannot display image files sent as part of instant messages, a "no image" icon can be displayed, or a message can be generated to the effect that the pal cannot read the image being sent as part of an instant message, or both. Additional information may be made available for each pal in various ways, such as, for example, by providing a pop-up list that is evoked either manually as by a right mouse click when the cursor is over the pal, or automatically when the cursor is moved over the pal.

The term "device presence" refers to the type of online messaging device that the particular pal is using at the time, and is represented in FIG. 1 by an icon (although any distinctive font, color, icon, and so forth may be used to so indicate). Many different types of messaging are possible, including, for example, HTML browser clients and downloaded IM clients, visual messaging services provided by various operating systems and applications running on personal data assistant devices and mobile phones, and audio messaging services provided by various operating systems and applications running on personal data assistant devices and computers as well as internet phones such as the recent Java-based J2ME phones like the Accompli 008i from Motorola, Inc. of Schaumburg, Ill. A pal may use several different types of messaging, which may be represented by additional icons on the same line, by other lines for the same user but distinguished by different device presence icons, by a pop-up list, and so forth. The pals list show in the pals panel 100 of FIG. 1 is configured, for example, to show all pals having a computer browser presence, which is indicated by the keyboard device presence icons next to their names.

A pal that is not online may set an offline notification device, which includes, for example, internet email, mobile telephones, wireless personal data assistants, and facsimile accounts and machines. The offline notification device notifies the pal that an instant message has been sent to the pal. The notification may be immediate or delayed, depending on the capabilities of the offline notification device. Delivery of the instant message may be handled in a variety of ways. One approach is to delay delivery of the instant message for a particular amount of time or indefinitely, as desired, until the pal goes online with an online device presence. Another approach is to deliver as much of the instant message as can be received by the designated offline notification device. Yet another approach is not to deliver the instant message at all. In the case wherein the offline notification device can receive some but not all of the instant message, the sender is notified of the partial nature of the delivery.

The term "personal presence" or "availability," which applies in such contexts as an instant message exchange, refers to the type of presence of an individual. Availability is represented in FIG. 1 by a parenthetical descriptive word (although any distinctive font, color, icon, and so forth may be used to so indicate). For example, if an individual is actively working at a computer that is running a browser suitable for instant message exchange, the availability message is "available." If the person leaves the computer for an extended period of time and the pal's computer is programmed to detect and signal a prolonged period of inactivity, the availability message is "idle." If supported by the pal's computer, a pal may signal certain types of presence such as "out to lunch" or "back in 5 minutes" and so forth.

Messaging sessions may be initiated from the pals panel 100. For example, an individual messaging session is initiated by selecting the "Individual" heading to expand a pals list, and selecting a pal from the pals list. Additional individual sessions may be initiated with other pals in the same way.

A broadcast messaging session is a type of group session in which the user who initiates the session is able to send an instant message to many recipients, and each broadcast recipient is able to respond back to the initiating user in an instant message. However, the response from a broadcast recipient is not sent to the other broadcast recipients. A broadcast messaging session is initiated in any desired way. One way is for the user to select the "Broadcast" heading to display a pals list (any previously expanded heading collapses), in which event the user is prompted to (a) name the broadcast messaging session; and (b) select any number of pals from the pal list displayed under the "Broadcast" heading to receive the broadcast. Selected pals may be indicated in any convenient manner, such as by using check boxes, color, font style, and so forth. Predefined broadcast groups and user-defined broadcast groups may also be included as a pal in the pals list under, for example, the "Individuals" heading, so that a predefined broadcast can be initiated from the "Individuals" heading.

A conference messaging session is a type of group session in which an instant message sent by any one of the conference participants is received by all of the conference participants. A conference session is initiated in any desired way. One way is for the user to select the "Conference" heading to display a pals list (any previously expanded heading collapses), in which event the user is prompted to (a) name the conference messaging session; and (b) select any number of pals from the pal list displayed under the "Conference" heading to participate in the conference. The user may also be prompted to establish confidentiality and control rules for the conference. As in the case of broadcast messaging sessions, predefined conference groups and user-defined conference groups may also be included as a pal in the pals list under, for example, the "Individuals" heading, so that a predefined conference can be initiated from the "Individuals" heading.

The manner described herein for selecting registered pals for individual, broadcast and conference sessions is illustrative, and other techniques may be used if desired. In one example, the pals are simply listed in the pals panel 100 and the type of messaging session is controlled by the number of clicks of the mouse. One click on a listed pal opens a new individual session. Two clicks on a listed pal adds the listed pal to an engaged broadcast session, or if none is engaged, creates a new engaged broadcast session with the listed pal as the first member. Three clicks on a listed pal adds the listed pal to an engaged conference session, or if none is engaged, creates a new engaged conference session with the listed pal as the first member. In another example, the pals are simply listed in the pals panel 100 and the type of messaging session is controlled by buttons or a pop-up dialog box. The pal is selected by a mouse click, or multiple pals are selected by multiple mouse clicks while the control key is held down, for example. Buttons or a pop-up menu give the user various options such as whether to open a new messaging session, the type of new messaging session, add the pal to an existing messaging session, or remove the pal from an existing messaging session, and so forth. In another example, clicking on the headings causes a new window pane containing the pal list to pop up.

A message history panel includes a display of sent messages, received messages, or both, depending on the type of messaging session and the preference of the user. In the instant message exchange context of FIG. 1, illustratively the message history panel 120 displays both sent and received messages. The first line "YOU SAY: Hello Anne. How are you today?" is an instant message which was sent by the user Zak to the pal Anne when the "Anne" individual session was initiated by Zak. The second line "ANNE: Hello, Zak. I am fine. How are you?" is an instant message which was sent by Anne in reply to Zak's instant message. Anne's message happens to have an associated image of a smiling face, which is displayed in the message history panel 120 either as a full image 122 (if small enough, as is so with the smiling face) or as a thumbnail. If a thumbnail is displayed, the full image may be displayed by the user in any convenient manner, such as, for example, by passing the cursor over it or by clicking on it to open the full image in a pop up window. Alternatively, the full image may be displayed automatically in a separate window (not shown) or in a pop up window (not shown) when the message history panel 120 containing the instant message is engaged. A scroll bar 124 is also supplied in the message history panel 120, either permanently or when needed.

A composition panel 130 includes a display of the message to be sent, either as it is being created or as the result of importing one or more files or other such actions, and may include additional elements as desired. Illustrative features of the composition panel 130 of FIG. 1 include a text pad 136, an image pad 138, and a composition toolbar 137. The text pad 136 is where the user enters the text for the user's message using any convenient input device, typically a keyboard although other text input techniques such as handwriting recognition and voice recognition may be used as well. The image pad 138 is where the user enters image-related content associated with the message. The image-related content may be entered in any desired manner, such as by use of a suitable digitizer attached to the user's computer, or from any suitable file available to the user, including clipart, picture, animation, video, multimedia, and other such files. Suitable digitizers and image transfer techniques are described in U.S. patent application Ser. No. 09/294,249, filed Apr. 19, 1999 (Challa et al., Apparatus and Method for Handwriting Capture) and in U.S. patent application Ser. No. 09/412,212, filed Oct. 05, 1999 (Gannage et al., Method and Apparatus for Digitally Capturing Handwritten Notes), which hereby are incorporated herein in their entirety by reference thereto. The composition toolbar 137 illustratively sits directly below both the text pad 136 and the image pad 138. The composition toolbar 137 illustratively can be context sensitive with the text pad 136 and the image pad 138, meaning that either text or image tools are displayed in the composition toolbar 137 depend on which one of the text pad 136 and the image pad 138 has focus. As shown in FIG. 1 wherein the text pad 136 has focus, the composition toolbar 137 displays font attribute tools 132, namely bold, italics, and underline tools. When the image pad 138 has focus (not shown), the composition toolbar 137 displays various imaging tools such as, for example, a file import button, an image pad resize button, and so forth. Alternatively, the composition toolbar may be made large enough to include all important text and image tools. Alternatively, certain tools may be invoked by clicking in the text pad 136 or 138; for example, a file import button may be invoked by clicking in the image pad 138 when it is empty. Illustratively, the composition toolbar 137 also includes a small messages menu window pane 134 and associated menu pull down button 135. The messages menu invoked by the button 135 includes a variety of useful shortcuts, such as various standard text only messages, image only messages, and coordinated text and image messages that when selected are automatically placed on the text pad 136 and/or the image pad 138 as appropriate. Examples of useful text are user pal information, routine meeting announcements, holiday and other greetings, and so forth. Useful images include map directions, the user's picture, the user's business card, and so forth. Examples of coordinated text and image are directions in text and map form, a greeting card containing a greeting and a pertinent picture, and so forth. These messages may be predefined by the distributor of the browser software, generated by the user using any suitable composition tool, furnished by the user's instant messaging service, and so forth, and are stored, for example, on the server that manages the user's instant messaging service. Features of the composition panel 130 may be displayed in various ways, such as by default, as needed, or as manually configured. In one configuration, for example, the text pad 136 and a composition toolbar 137 may be displayed by default, while display of the image pad 138 is commanded by the user by use of a keystroke, a virtual button, a pop-up or pull-down menu, selection of an image file from a file browser window, a predetermined mouse action, and so forth. The image pad 138 may also be represented as a thumbnail in proximity to the text within the text pad, and can be displayed with a mouse action over the thumbnail or with any of the foregoing techniques.

The session command bar 140 illustratively sits below the editing toolbar 137. Illustrative features of the session command bar 140 include a "Send Message" command 142 for sending messages composed in the text pad 136 and the image pad 138, a "Forward" command 143 for forwarding messages and forwarding entire messaging sessions with or without annotation to another pal or to the user's archives, and an "End Session" command 144 for ending or "closing" the engaged messaging session. In FIG. 1, the engaged messaging session is indicated by the session tab 110. Illustratively, the session command bar 140 also includes a small availability status setting menu window pane 146 and associated menu pull down button 148. The user indicates his or her availability from such choices as "Available," "In a meeting," "Out to lunch," "Back in 5 minutes," and so forth.

Other commands useful for managing the messaging sessions may be added to the various panels in various ways (not shown), or made part of the application menu at the top of the user's computer display (not shown). These commands relate to application preferences, initiation of new individual, broadcast, and conference sessions, administration of the pal list, the setting of various application options, the attachment of various application files such as word processor, spreadsheet, presentation, and data base, invocation of various functions such as help and logout, and so forth.

Figure 2A:
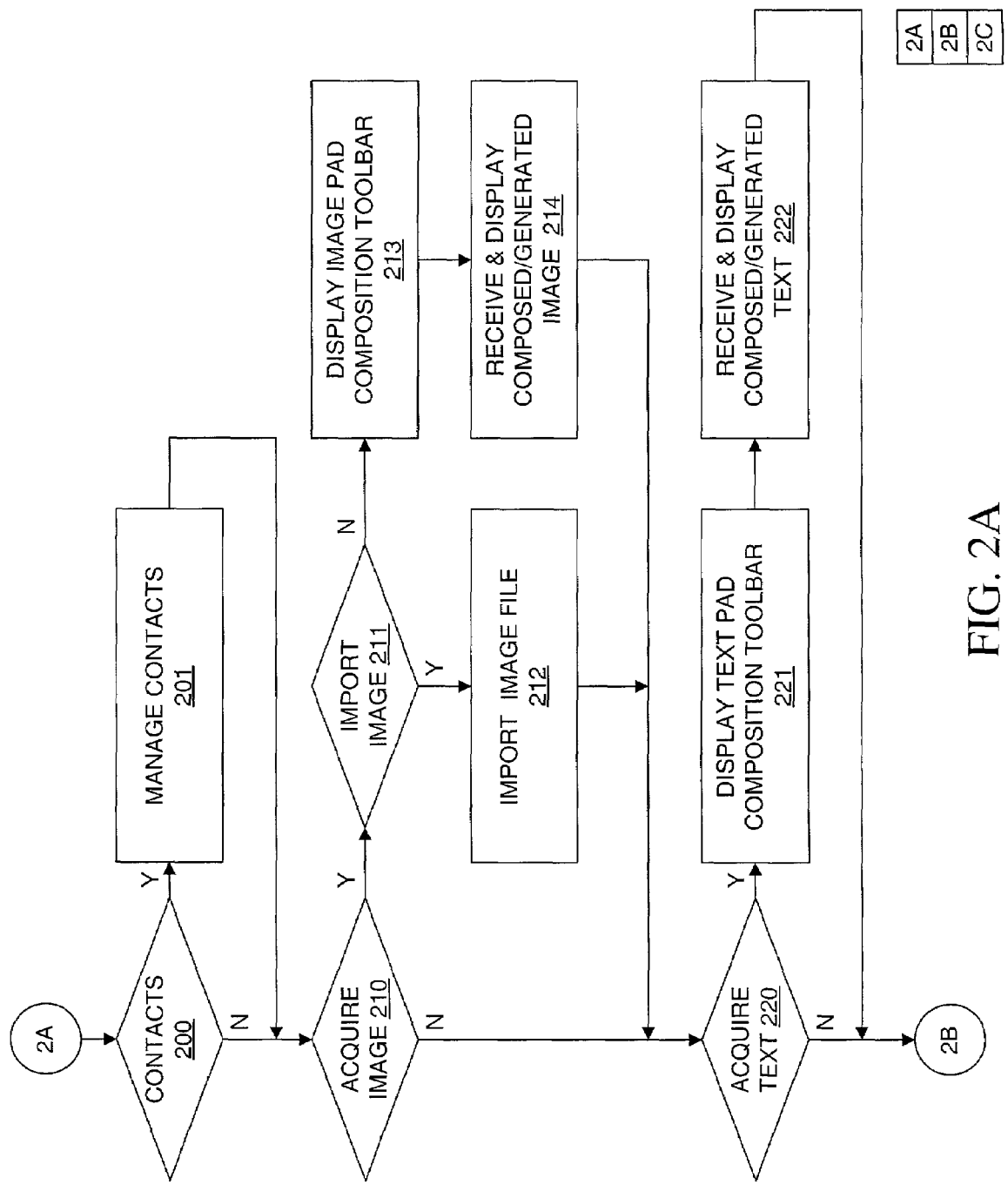
FIGS. 2A, 2B and 2C are partial views of a flowchart of a process for carrying out various functions of the graphical user interface of FIG. 1.
Figure 2B:
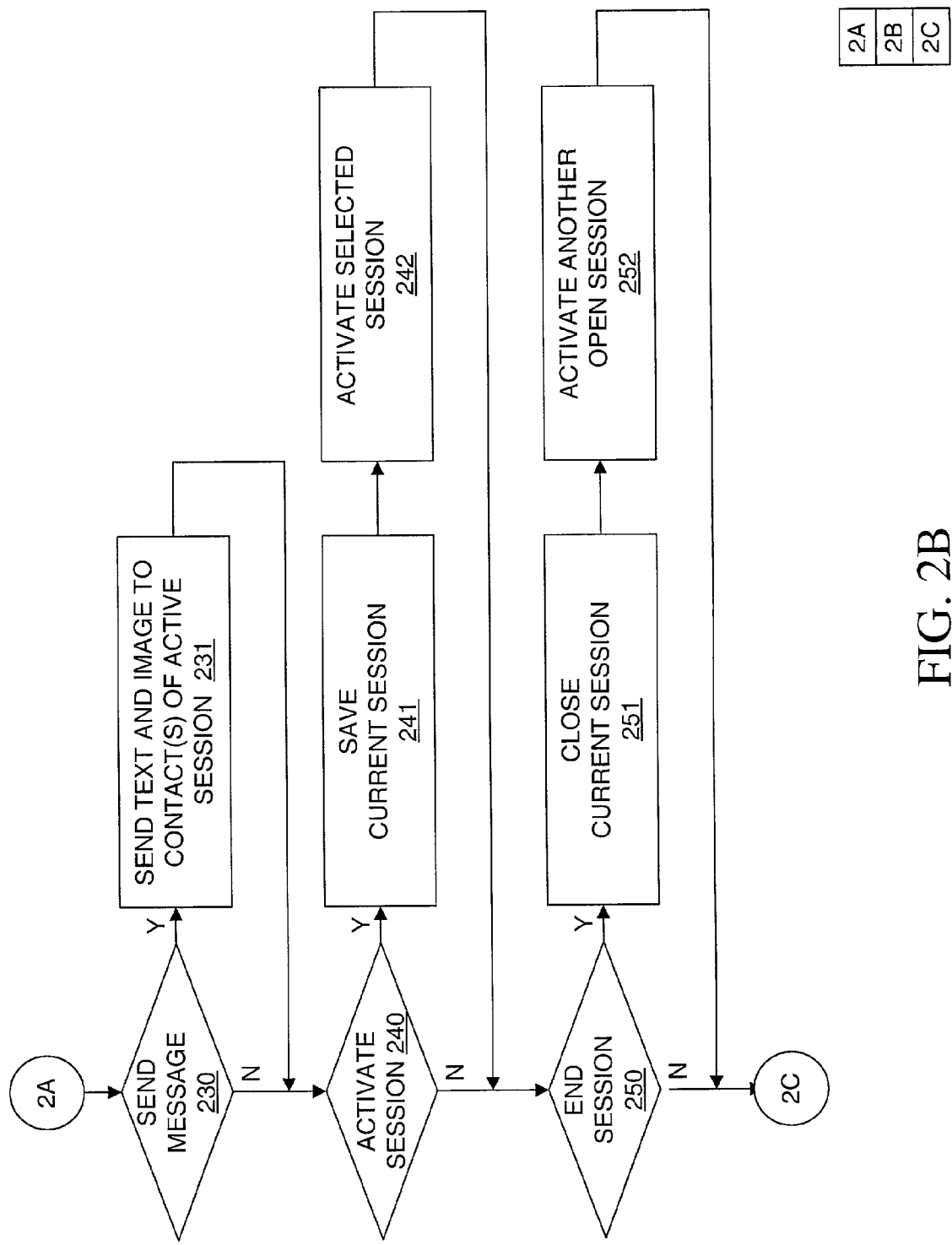
Figure 2C:
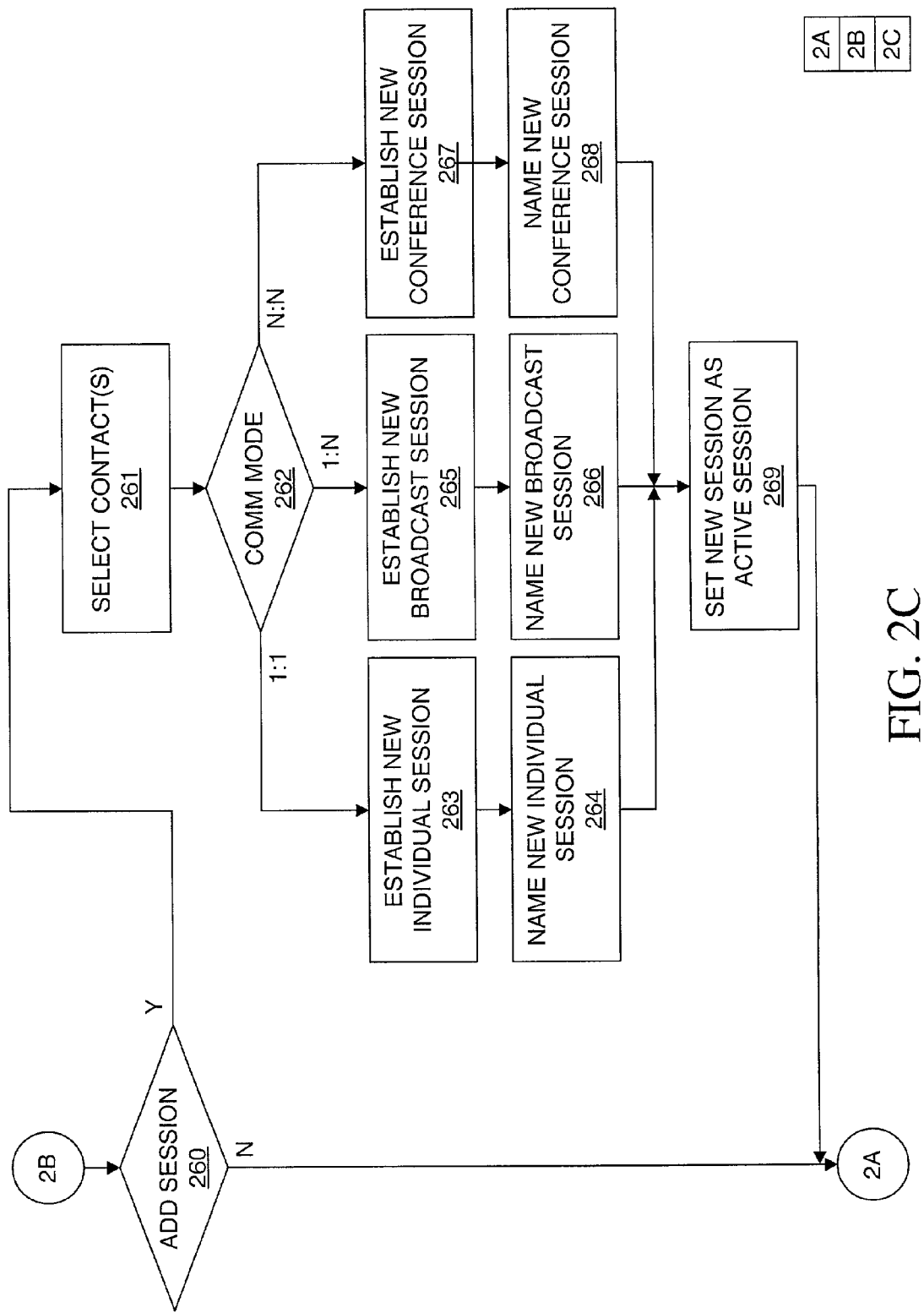

The multiple messaging session management architecture of the graphical user interface shown in FIG. 1 greatly facilitates the user's management of many messaging sessions. An example of the management of multiple instant message exchange sessions is shown in the flowchart of FIGS. 2A, 2B and 2C. Some of the basic functions of instant message exchange are to manage the pals panel (block 200), acquire an image (block 210), acquire text (block 220), send an instant message (block 230), select a messaging session for activation (block 240), end a messaging session (block 250), and add a new messaging session (block 260).

To compose an image using the composition panel 130 shown in FIG. 1 (block 210—yes), the user may import an image file or compose an image by drawing or writing on or otherwise activating a suitable graphical input device. If the user wishes to import an image file (block 211—yes), the user may do so (block 212) in any suitable manner, including such well known techniques as by a file browser window, click and drag from a folder, copy from a folder, and so forth. With the availability of wireless local area network technology such as the Bluetooth technology, images may also be imported wirelessly from other devices, including screen images. Tools for importing files (not shown) may be incorporated into the composition toolbar 137 if desired, on the application toolbar, as a pop up window, or elsewhere as desired. Inclusion of the image file may be indicated in any suitable manner, such as by a thumbnail in the text pad 136, a small version of the image in the image pad 138, or a larger or full size version of the image in a pop-up window (not shown). If the user wishes to compose an image (block 211—no), the user begins to draw or write on the graphical input device or selects a standard image using the messages menu window pane 134 and the associated menu pull down button 135. The user's actions are detected by the user's client application, which activates an image pad composition toolbar suitable for the type of graphical input device used (block 213) and receives and displays the composed or generated image on the image pad 138 (block 214). Illustratively, the image is displayed on the image pad 138 as it is created. If desired, the client application may increase the magnification of the image pad 138, illustratively by 4× or more, so that the section of the image being composed is shown in more detail, or may pop up a larger window for displaying the entire image pad in more detail. The image pad 138 in FIG. 1 contains a sketch of an office floor plan, and indicates with an arrow how to find conference room B from an outside hallway. Illustratively, the user either sketches the floor plan on any suitable digitizer or with any suitable digitizing tool, or selects a standard image file containing the floor plan image using the messages menu window pane 134 and the associated menu pull down button 135.

To compose text using the composition panel 130 of FIG. 1 (block 220), the user begins to type or write or otherwise activates a suitable text input device. The user's actions are detected by the user's client application, which activates a text pad composition toolbar (for example, the toolbar 137 in FIG. 1) suitable for the type of text input device used (block 221) and receives and displays the composed or generated text on the text pad 136 (block 222). Illustratively, text is displayed on the text pad 136 as it is created. The text pad 136 in FIG. 1 contains a message typed by Zak requesting Anne to meet him in conference room B. Text may also be imported from files or cut and paste from other windows.

Figure 3:
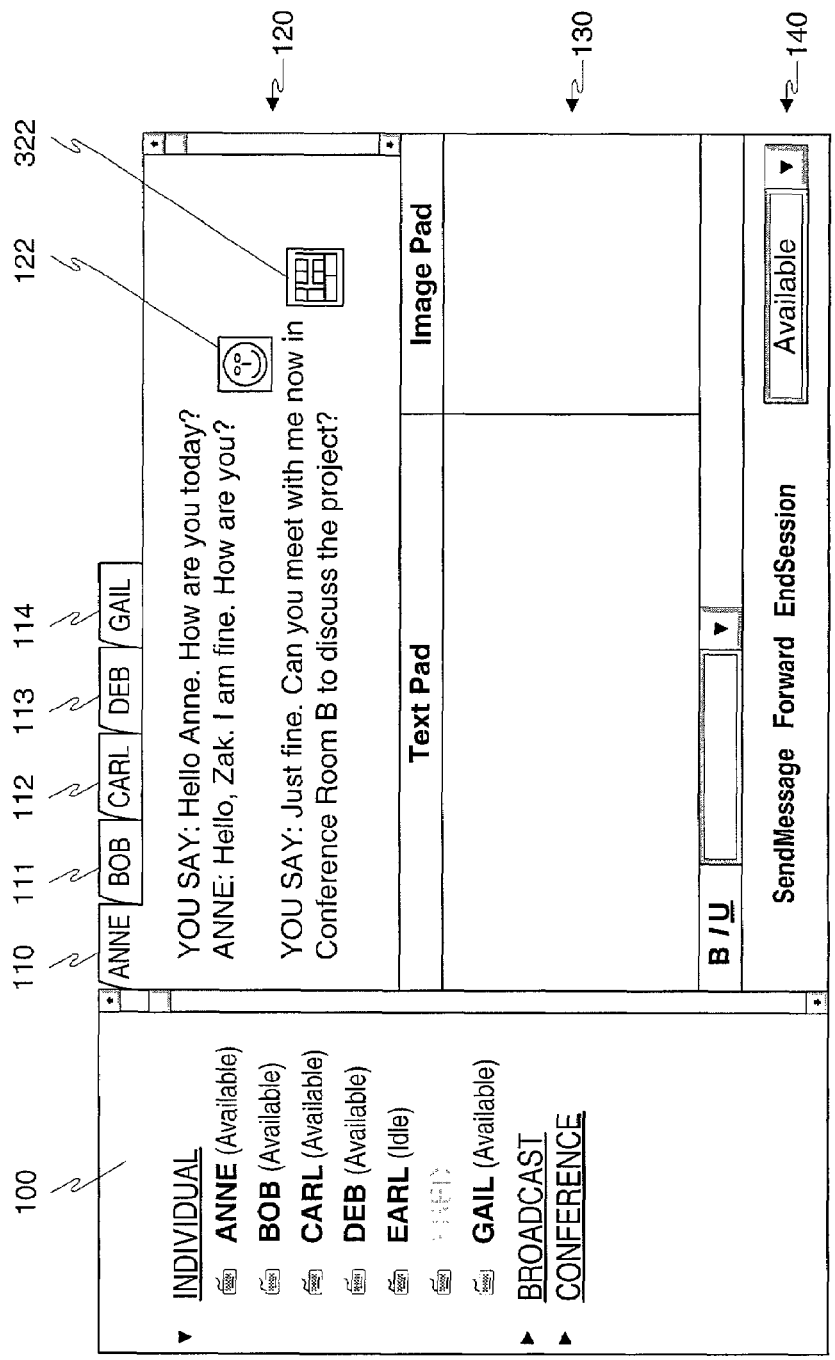
FIG. 3 is a pictorial representation of the graphical user interface of FIG. 1 after execution of a "send" command.

To send an instant message to the pal or pals involved in the engaged session using the composition panel 130 of FIG. 1 (block 230), the user illustratively moves a mouse cursor over the "Send" command 142 in the session command bar 140 and clicks. Other command techniques such as keyboard commands (e.g. the enter key), typed commands in the text (e.g. ENTER typed at the end of the message in the text pad 136), and voice commands may be used instead of mouse commands, if desired. In response, the user's client application sends the contents of the text pad 136 and the image pad 138 to the pal or pals which are part of the engaged session (block 231), which in FIG. 1 is the pal Anne as indicted by the session tab 110. The result of the "Send" command is illustrated in FIG. 3.

The session tab 113 in FIG. 1 is shown cross-hatched in a direction opposite that in FIG. 1, to depict a solid color indicating the receipt some time ago of an instant message by the user's client application from Deb. The user may be given the option of selecting among a variety of different messaging session coding schemes or of defining a custom messaging session coding scheme. The session tab 113 is not shown as flashing in FIG. 3 because the new message notification period has expired. The new message notification period may be either a fixed period of time or a user defined option.

Figure 4:
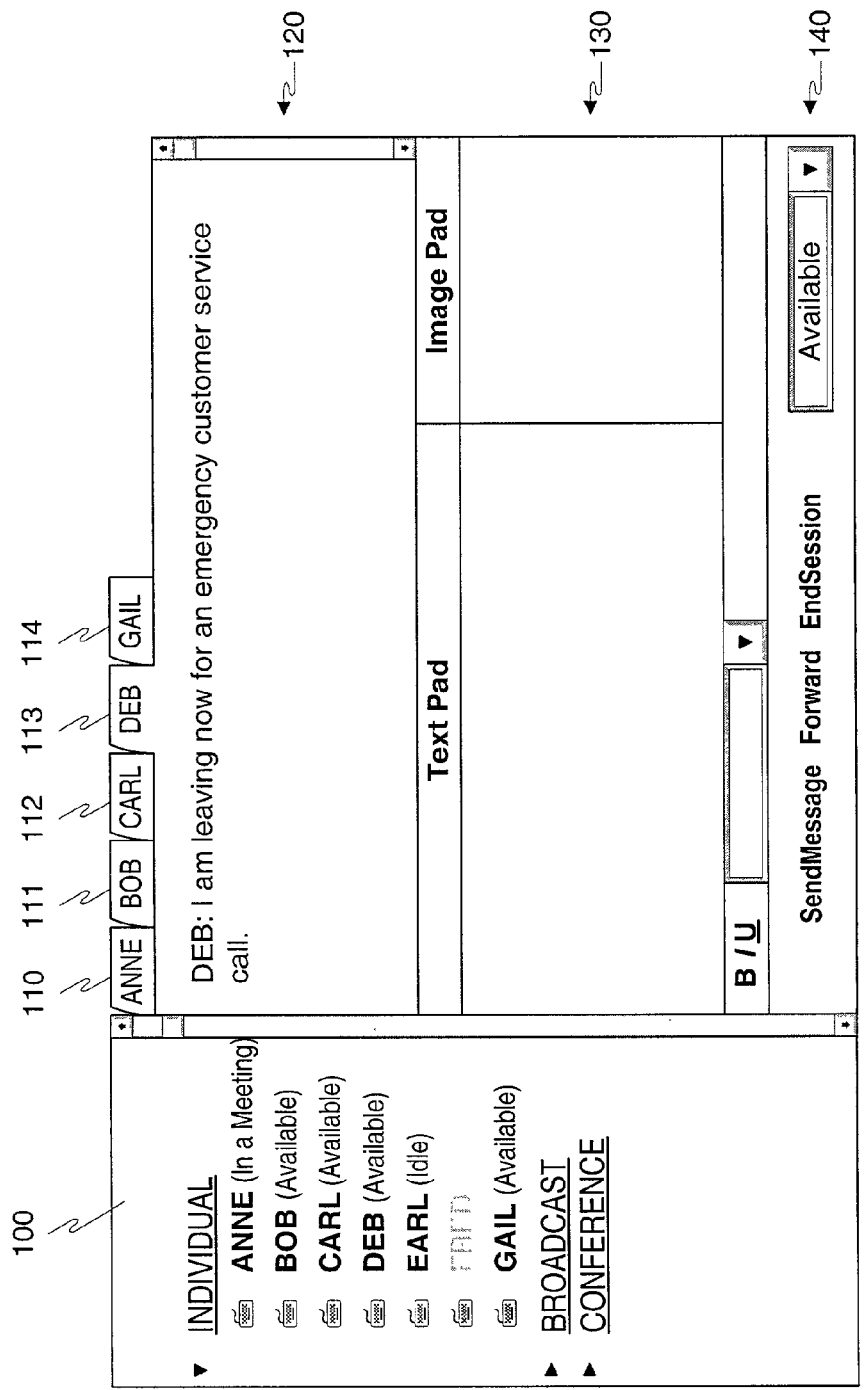
FIG. 4 is a pictorial representation of the graphical user interface of FIG. 3 after activation of the "Deb" messaging session.

To activate another session in place of a currently engaged session using the session tabs of FIG. 1 (block 240), the user illustratively moves a mouse cursor over the session tab for the session which the user wishes to make engaged, and clicks. Other command techniques such as keyboard commands, typed commands, and voice commands may be used instead of mouse commands, if desired. In response, the user's client application saves the contents of the message history panel 120 and composition panel 130 for the current session (block 241), and refreshes the message history panel 120 with the message history panel contents and composition panel contents for the now engaged session (block 242). The session tab for the now engaged session merges with the message history panel 120 while the session tab for the previously engaged session recedes behind the now engaged session. FIG. 4 is an example which shows the results when the user clicks on the session tab 113 of the graphical user interface of FIG. 3, which causes a new message from Deb to be displayed in the message history panel 120. The session tab 113 is shown as merged with the message history panel 120.

Alternatively, the contents of the composition panel 130 need not be saved with the message history for a messaging session, but rather may persist as another messaging session is activated. In other words, the message composition panel and the session command bar are not associated with any particular messaging session. Rather, they are shared among all of the messaging sessions, although their use typically is in conjunction with whatever messaging session happens to be engaged at the time.

Figure 5:
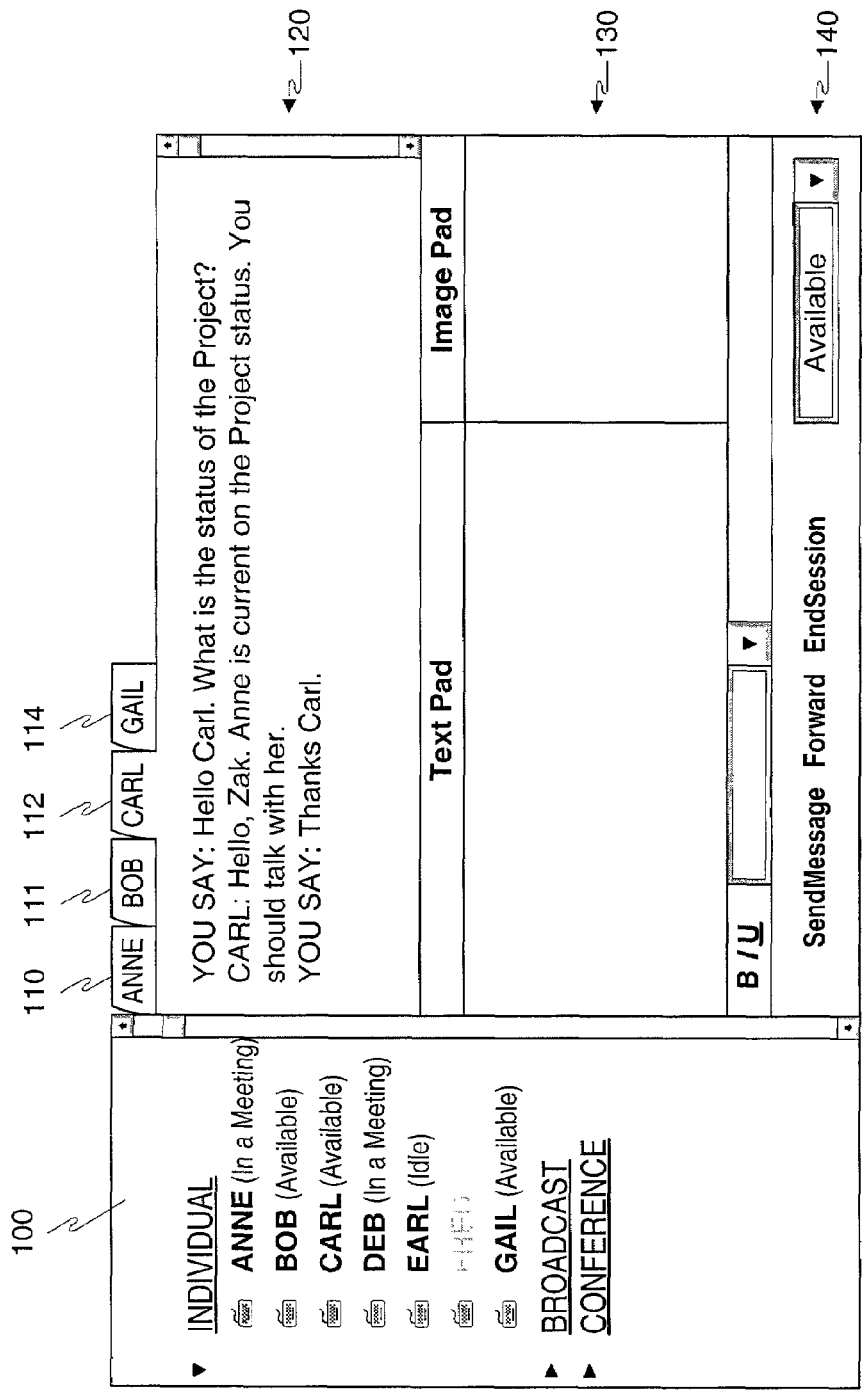
FIG. 5 is a pictorial representation of the graphical user interface of FIG. 4 after ending the "Deb" messaging session.

To end an engaged messaging session using the session command bar 140 of FIG. 1 (block 250), the user illustratively moves a mouse cursor over the "EndSession" command 145 in the session command bar 140, and clicks. Other command techniques such as keyboard commands and voice commands may be used instead of mouse commands, if desired. In response, the user's client application warns the user that the messaging session is about to end, closes the current messaging session (block 251), and refreshes the message history panel 120 with one of the open messaging sessions (block 252) which becomes the engaged messaging session. Illustratively, the messaging session to the left of the messaging session being ended is made the engaged messaging session. Alternatively, logic in the user's client application may determine which messaging session to make engaged based on some criteria, such as the number of pending messages, the last engaged messaging session, and so forth. The result of the "End Session" command is illustrated in FIG. 5, which shows that the sessions tab 113 is no longer displayed. The availability for Deb now reads "In a meeting" since Deb has left for the customer meeting and has changed her availability to indicate this.

To add a messaging session using the pals panel 100 as shown in FIG. 1 (block 260), the user clicks on or otherwise selects one of the headings, which expands the selected heading into a pal list, and then selects a pal (under the "Individual" heading) or multiple pals (under the "Broadcast" and "Conference" headings) from the pal list (block 261). In FIG. 1, for example, the user has clicked on the "Individual" heading while in FIG. 6, for example, the user has clicked on the "Broadcast" heading. In each instance, the user's pals Anne, Bob, Carl, Deb, Earl, Fred and Gail are listed. A pointer symbol next to the selected heading—"Individual" in FIG. 1 and "Broadcast" in FIG. 6—is downward directed to indicated that the heading is expanded. Pointer symbols next to the other headings are sideward directed to indicate that these headings are collapsed. The user's pals that are not online are displayed in the examples of FIG. 1 and FIG. 6, although they could omitted if desired or distinguished in any desired manner from the online pals, based on the user's preferences.

The user's client application responds to the user's selection of a heading to establish a messaging mode (block 262). For example, when the user selects the "Individual" heading and thereafter selects a pal, the user's client application responds by establishing a new individual session (block 263) and names the new individual session in any desired way (block 264), such as, for example, by using the selected pal's name or, in the case of an SMS pal, the SMS pal's phone number. The new messaging session is set as the engaged messaging session (block 269), which involves generating a docked window pane set along with a session tab containing the individual session name. When the user selects the "Broadcast" heading, the user's client application responds by establishing a new broadcast session (block 265) and names the new broadcast session in any desired way (block 266), such as, for example, by requesting a name from the user or generating a unique name based on a suitable naming algorithm. After the name is entered or generated, the new broadcast session is set as the engaged messaging session (block 269), which involves generating a docked window pane set along with a session tab containing the broadcast session name. The user may then designate the pals to participate in the broadcast session by selecting their names from the pals list under the expanded "Broadcast" heading before sending any broadcast message. The user establishes a new conference session (block 267) and names the new conference session (block 268) in much the same way as described in the example of a broadcast session.

Figure 6:
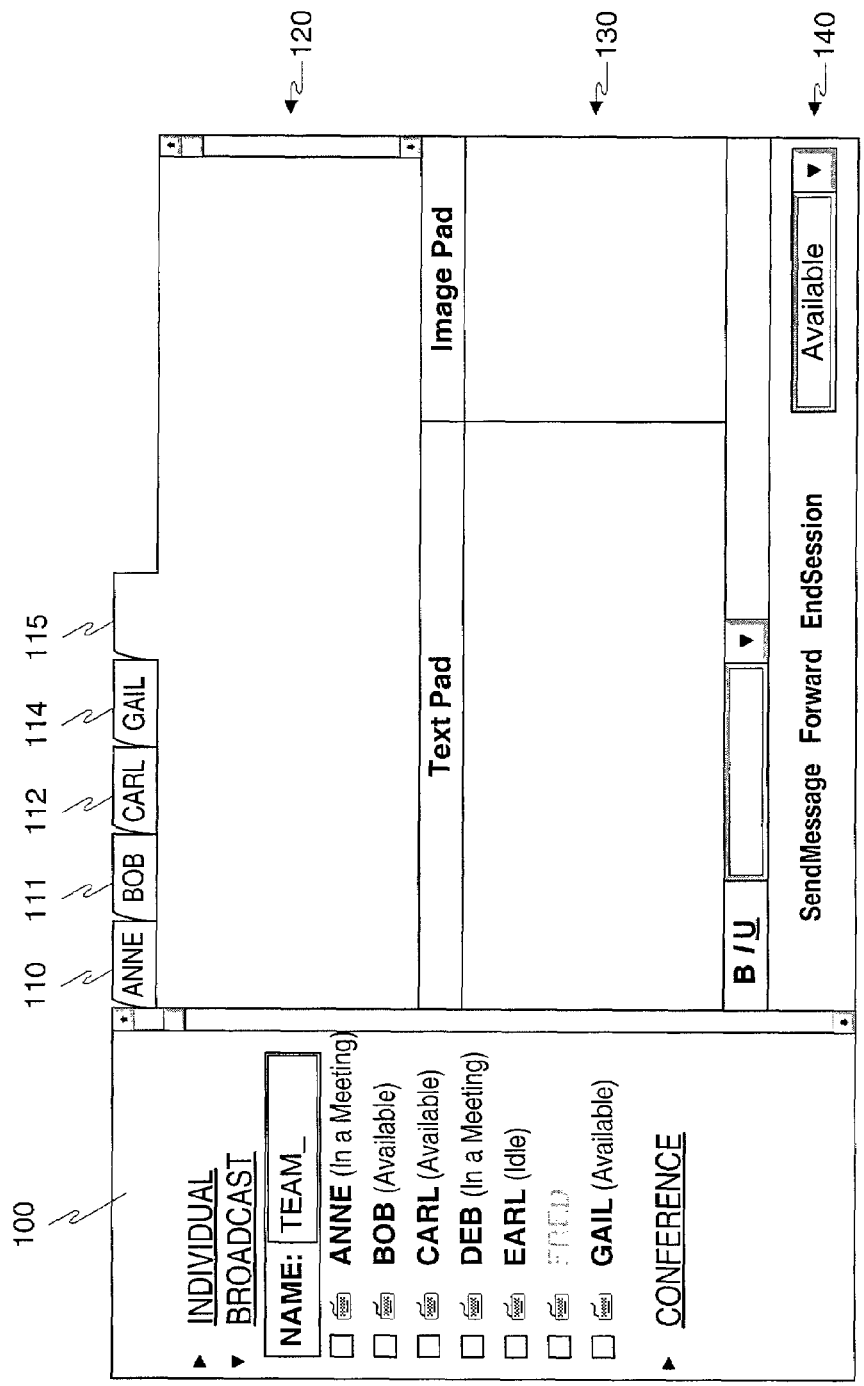
FIG. 6 is a pictorial representation of the graphical user interface of FIG. 5 being used to initiate a new broadcast session.

The example of FIG. 6 results from the user's having clicked on the "Broadcast" heading. The user's client application responds by opening a new blank message history panel having a blank session tab 115, expanding the "Broadcast" heading with a name entry box followed by the pals list, and prompting the user to type in a name for the broadcast session by placing a text cursor in the name entry box. Any suitable naming procedure may be used, including a pop-up dialog window or direct entry into the tab. Any suitable prompting technique may be used to drawing the name entry box to the user's attention, including color highlighting, flashing, and so forth. The user has typed the broadcast session name "Team" in the entry box under the "Broadcast" heading. When the user has finished entering the messaging session name and tabs out of or clicks outside of the name entry box, the new messaging session becomes engaged with the name "Team," as shown in FIG. 7.

Illustratively, a checkbox is associated with each of the pal names under the expanded "Broadcast" heading of FIG. 6. FIG. 7 shows an example of how the user might fill in the checkboxes. The filled checkboxes next to Bob, Carl, Deb, Earl, Fred and Gail indicate that all of these individuals are participants in the engaged broadcast session. Anne is online, but as she will be meeting with Zak, Zak has excluded her from the broadcast session as indicated by the empty checkboxes next to Anne's name. The use of a checkbox to identify participants in a broadcast session is exemplary, and other techniques may be use such as, for example, color coding, font style, bullets, any distinctive notation, and so forth.

Providing the ability to make multiple pal selections and providing suitable selection identification techniques facilitates the user's management of a multiple pal messaging session. Whenever a broadcast or conference session is engaged, illustratively the "Broadcast" or "Conference" heading as appropriate is automatically expanded to reveal the participants in the engaged session. Pals may be added as participants by checking their checkboxes in the pals list, and pals may be removed as participants by clearing their checkboxes in the pals list. When an individual session is engaged, it is also useful for the "Individual" heading to expand to reveal the pals list, from which the device presence, availability, and if supported, other information about the pal in the individual session is available.

Figure 7:
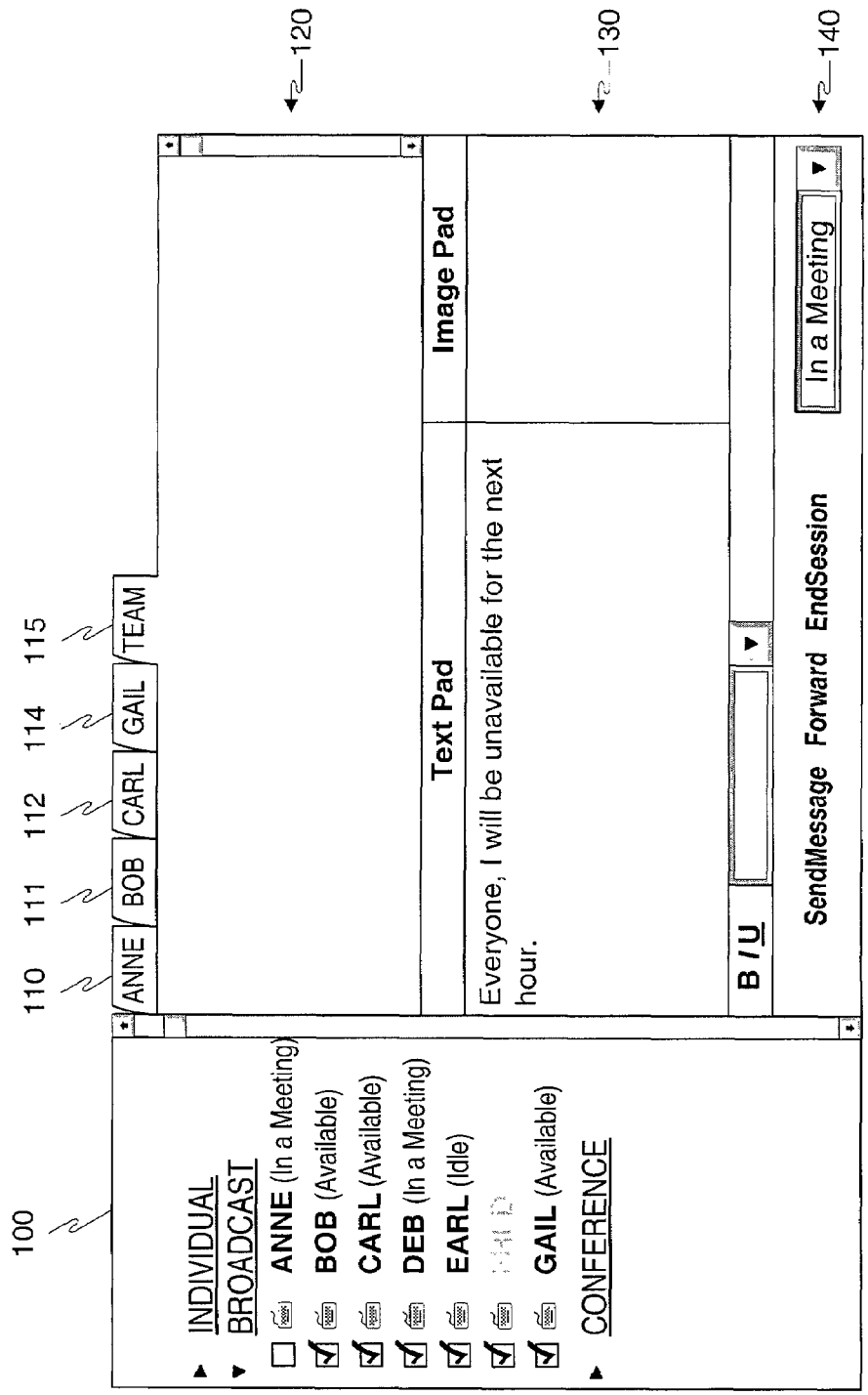
FIG. 7 is a pictorial representation of the graphical user interface of FIG. 6 after selection of pals and the composition of a text message for the new broadcast session.

FIG. 7 also shows the broadcast message "Everyone, I will be unavailable for the next hour" which the user types into the text pad 136 in a manner described elsewhere in this document; see, e.g., block 220 in FIG. 2A and associated text. The user then sends the broadcast message in a manner described elsewhere in this document; see, e.g., block 230 in FIG. 2A and associated text.

A conference session is initiated in essentially the same way as a broadcast session.

In an alternative technique for establishing a group messaging session such as a broadcast or conference messaging session, the user selects the recipients/participants from the user's pals list and assigns a name to the group. The user's client application responds by establishing a broadcast or a conference pal, as the case may be, which is added to the user's pals list. The user establishes a messaging session by selecting the broadcast or conference pal from the pals list, in the same way as an individual messaging session is established.

While having multiple instant message exchange window pane sets upon one's desktop can be disadvantageous because of the clutter and potential for confusion, having at least a certain number of multiple instant message exchange window pane sets may be desirable under certain circumstances such as, for example, when the user wishes to monitor one messaging session while preparing a message in another messaging session, cut content from one messaging session and paste it into another, combine messaging sessions (useful, for example, when starting a conference after several earlier sessions, so that the earlier sessions can be aggregated and all conference participants can be brought up to speed), and so forth. Advantageously, the multiple messaging session management architecture of the graphical user interface facilitates the user's management of multiple instant message exchange sessions by providing for window pane sets selectively convertible between a docked state and an undocked state. Either state may be set as the default preference for the instant message exchange application, but at anytime a user may manually dock or undock a messaging session by dragging the messaging session away from or onto the pals list panel.

Figure 8:
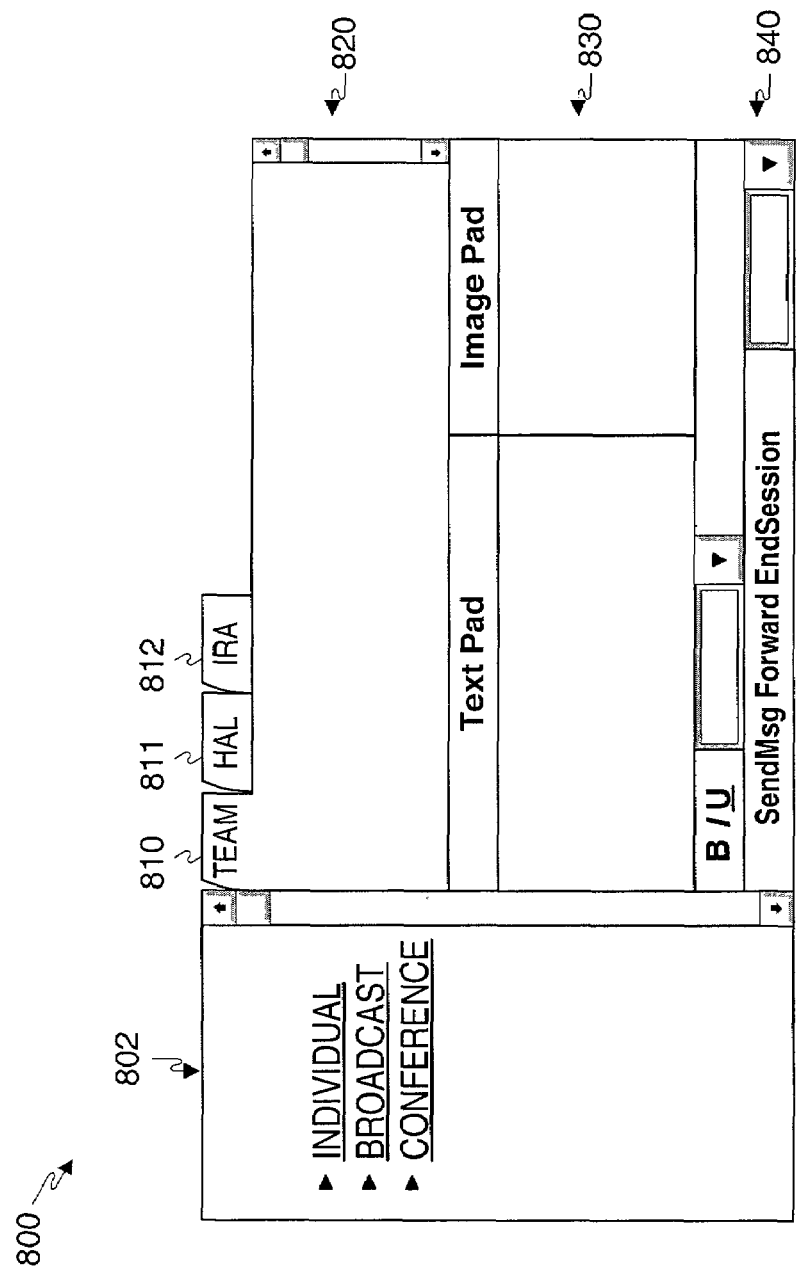
FIG. 8 is a pictorial representation of a graphical user interface having a window pane set for three docked messaging sessions.

FIG. 8 shows an illustrative graphical user interface which includes a window pane set 800 having a number of docked messaging sessions identified by the session tabs 810, 811 and 812. The messaging session identified by the session tab 810 is, illustratively, a conference session among a number of team members, which is named "Team." The messaging sessions identified by the session tabs 811 and 812 are individual sessions with Hal and Ira respectively, who may or may not be members of the Team conference session. The "Team" conference session is the engaged messaging session. The other components of the window pane set 800 are a pals panel 802, a message history panel 820, a composition panel 830, and a session command bar 840. When a messaging session is docked, the session tab for it is added in the space above the engaged message history panel 820; see, e.g., the session tabs 810, 811 and 812 in FIG. 8. The session tab for the engaged messaging session—for example, session tab 810—illustratively is merged with the message history panel—for example, message history panel 820—on which sent and received messages relating to the engaged messaging session are displayed. The user's client application maintains the message history for each messaging session and displays the message history associated with the particular tab that has focus, i.e. is engaged.

Figure 9:
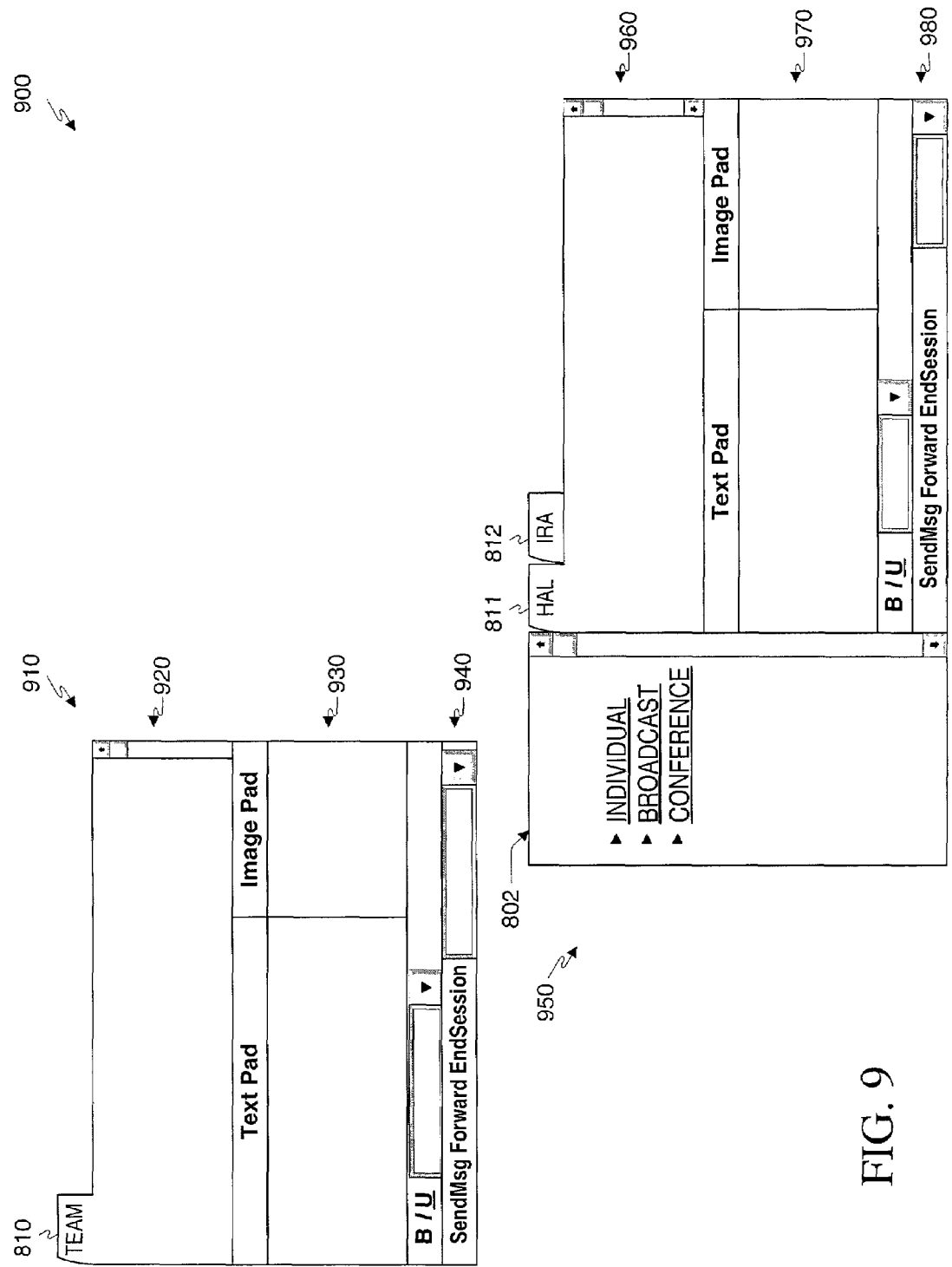
FIG. 9 is a pictorial representation of a graphical user interface having a window pane set for an undocked messaging session and a window pane set for two docked messaging sessions.

FIG. 9 shows a graphical user interface 900 having an undocked messaging session. The messaging session identified by the session tab 810, which is the conference session named "Team," is undocked. The undocked messaging session is represented in a window pane set 910 that includes a single session tab identifying the messaging session by name (e.g. session tab 810), a message history panel containing the message history for the messaging session (e.g. message history panel 920), a composition panel (e.g. composition panel 930), and a session command bar (e.g. session command bar 940). A messaging session may be undocked in any suitable way. The messaging session identified by the session tab 810, for example, is undocked by clicking and dragging on the engaged message history panel 820 (FIG. 8) or on any other area of the window pane set 800 associated with the engaged messaging session. Other techniques may be used for docking and undocking messaging sessions include, for example, button commands, keyboard commands, and voice commands. When the "Team" messaging session is undocked, the session tab 810 is deleted from the window pane set 800 containing the docked messaging sessions (FIG. 8). The just undocked "Team" messaging session illustratively remains the engaged messaging session and is suitably distinguished from other window pane sets (by color, texture, animation, icon, and so forth; not show) to so indicate, although any other messaging session such as one of the remaining docked messaging sessions may be so designated if desired. FIG. 9 shows the remaining docked messaging sessions as a window pane set 950 (FIG. 9) containing the docked messaging sessions "Hal" and "Ira," as identified by session tabs 811 and 812. The other components of the window pane set 950 are the pals panel 802, a message history panel 960, a composition panel 970, and a session command bar 980. Preferably, incoming messages are displayed on the message history panel 960 of the non-engaged messaging session as well as on the message history panel 920 of the engaged messaging session. Preferably, any message that was in the process of being composed on the composition panel 970 of the non-engaged messaging session when it became non-engaged is saved and continues to be displayed in an unfinished condition on the composition panel 970, although it cannot be completed or sent unless the composition panel 970 again becomes part of an engaged messaging session.

If the user wishes to see the message history for the Team messaging session concurrently with the message histories for both the Hal messaging session and the Ira messaging session, the user may undock the Hal messaging session from the window pane set 950 (FIG. 9). The result of undocking the Hal messaging session is shown in the graphical user interface 1000 of FIG. 10. The undocked messaging session represented by the window pane set 1010 (FIG. 10) is undocked from the window pane set 950 containing the docked messaging sessions (FIG. 9) by, for example, clicking and dragging on the engaged message history panel 960 or on any other area of the window pane set 950 associated with the engaged messaging session. Other techniques may be used for docking and undocking messaging sessions include, for example, button commands, keyboard commands, and voice commands. The undocked messaging session represented by window pane set 1010 includes the session tab 811 identifying the individual session named "Hal," a message history panel 1020 containing the message history for the "Hal" messaging session, a composition panel 1030, and a session command bar 1040. Illustratively, the undocked messaging session "Hal" is the engaged messaging session. When the "Hal" messaging session is undocked, the session tab 811 is removed from the window pane set 950 (FIG. 9), resulting in the window pane set 1050 (FIG. 10) containing the single docked messaging session "Ira" as identified by session tab 812. The other components of the window pane set 1050 are the pals panel 802, a message history panel 1060, a composition panel 1070, and a session command bar 1080.

Figure 10:
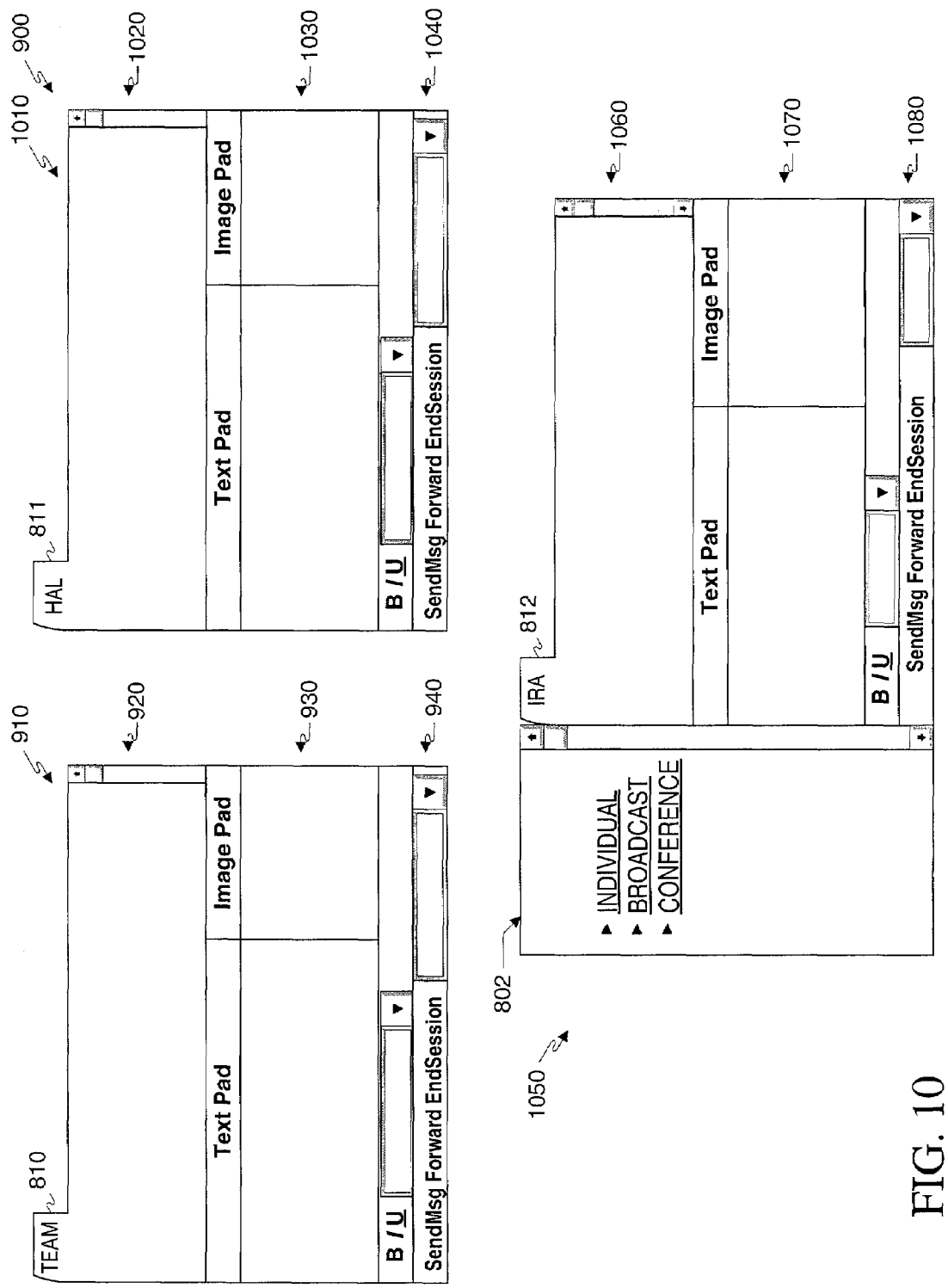
FIG. 10 is a pictorial representation of a graphical user interface having respective window pane sets for two undocked messaging sessions and a window pane set for one docked messaging session.

FIG. 10 shows a window pane set 1050 having one docked messaging session "Ira" which is identified by the session tab 812. In principle, even the messaging session "Ira" may be undocked from the window pane set 1050, which would leave the window pane set 1050 without any docked open messaging sessions. When no messaging sessions are open, the user's client system may display only a pals panel (not shown) or a window pane set (not shown) that includes a pals panel, an empty message history panel identified by a blank session tab, an empty composition panel, and a session command bar.

The term "window pane set" used herein usually refers to a number of window panes related to a messaging session, but also encompasses a single window pane related to a messaging session. For example, when messaging sessions represented by window pane sets 910, 1010 and 1050 (FIG. 10) are not engaged, the window pane sets 910, 1010 and 1050 need not include their respective composition panels (930, 1030 and 1070) or their respective session command bars (940, 1040 and 1080), thereby reducing the amount of space taken up on the display.

Figure 11:
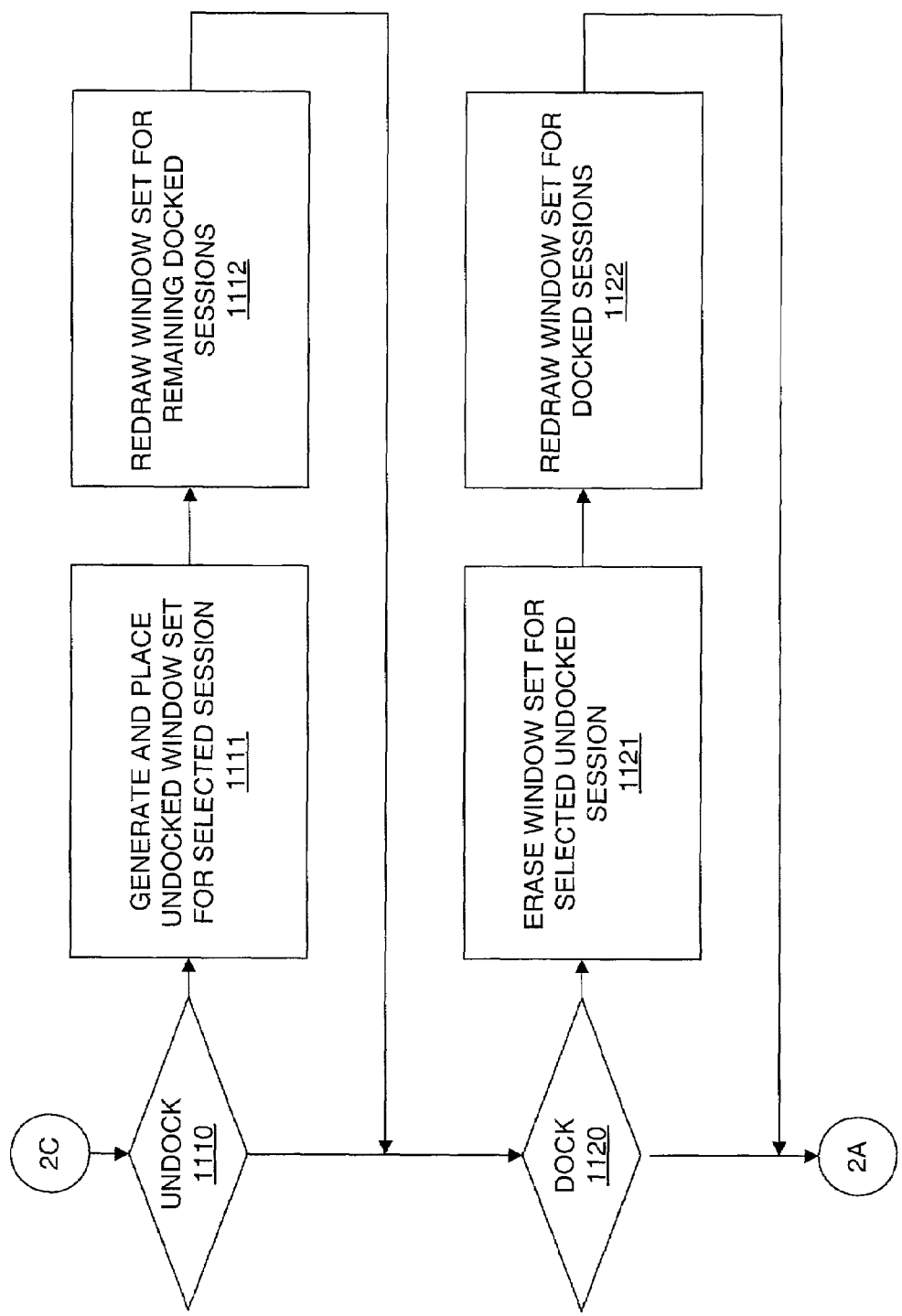
FIG. 11 is a flowchart of a process for carrying out the docking and undocking functions of the window pane sets of FIGS. 8, 9 and 10.

An illustrative process for docking and undocking window pane sets is illustrated in FIG. 11, which can be considered an enhancement of the process of FIG. 2. If the user desires to undock a particular messaging session (block 1110), the user clicks on and drags on any part of the window pane set for the engaged messaging session or on the session tab for a non-engaged messaging session (or uses any other desirable command technique). The user's client application responds by generating an undocked window pane set for the selected messaging session and locating the undocked window pane set on the display as directed by the user or by the user's client application defaults (block 1111). The just undocked messaging session retains its status as engaged or non-engaged. The window pane set for the remaining docked messaging sessions, if any, is redrawn to omit the just undocked messaging session (block 1112). If the just undocked messaging session is not the engaged messaging session, the engaged messaging session in the docked window pane set remains unchanged. However, it will be appreciated that if desired, the process of undocking may automatically designate the just undocked messaging session as the engaged messaging session or as a non-engaged messaging session. If the user desires to dock an undocked window pane set (block 1120), the user clicks on and drags on any part of the window pane set for the undocked messaging session (or uses any other desirable command technique). The user's client application responds by moving and then erasing the undocked window pane set as directed by the user or by the user's client application defaults (block 1121). The session information is saved. The window pane set for the docked messaging sessions is redrawn to include the just docked messaging session (block 1122). If the just docked messaging session is not the engaged messaging session, the engaged messaging session in the docked window pane set remains unchanged. If the just docked messaging session is the engaged messaging session, it becomes so in the docked window pane set. However, it will be appreciated that if desired, the process of docking may automatically designate the just docked messaging session as the engaged messaging session or as a non-engaged messaging session.

A variety of different types of session commands are useful in managing each of the messaging sessions, and may be placed on the session command bar 140 if desired. An example of one such command is "Forward" (see FIG. 1), which allows the user to annotate, if desired, and forward an entire messaging session to another pal or to the user's archives, or just forward a message to another pal. An example of how this command works is as follows. When the user clicks on the command, a menu pops up which provides the user the ability to select among various options such as to forward a message, to annotate a session, to forward a session, and to archive a session. The user selects the desired option and follows on-screen prompts to complete the desired operation.

Another useful session command is "Set Session Security" (not shown). An example of how this command may work is as follows. When the user clicks on the command, a menu pops up which provides the user the ability to select various levels of security for the engaged messaging session. For example, if the user designates a messaging session "Company Confidential," only pals having a company security clearance can be selected for the messaging session (whether individual, broadcast or conference) or can remain after the designation is made. Where the messaging session is an individual session, designating the messaging session "Company Confidential" when the pal is not cleared automatically ends the messaging session. As another example, the user may designate a messaging session "Closed," in which case only the user can add pals as participants, or may designate a messaging session "Open," in which case any participant can add his or her pals as participants. A fully open conference session with no rights reserved to the initiator and no confidentiality imposed is essentially a traditional chat session.

Figure 12:
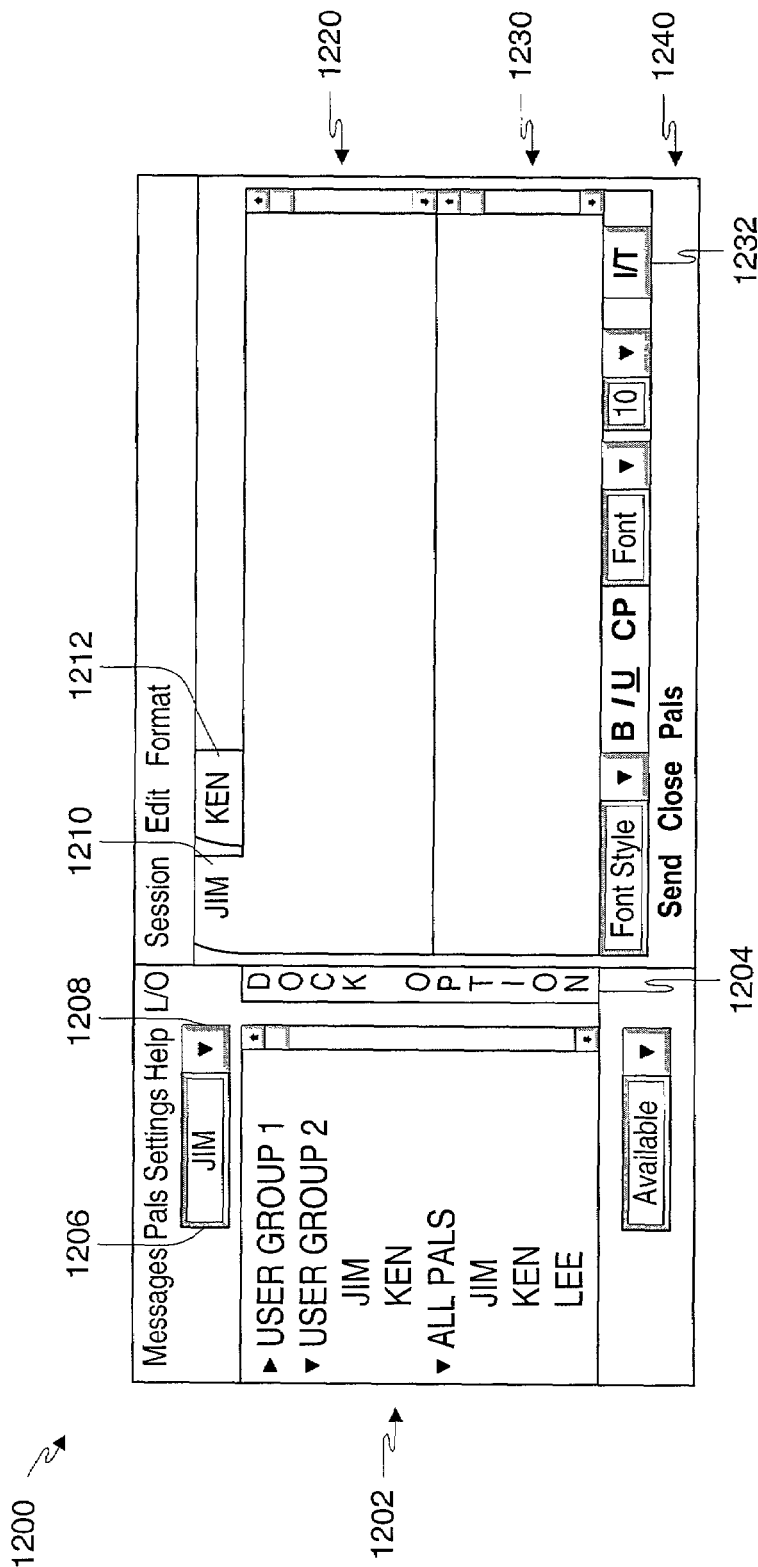
FIG. 12 is a pictorial representation of a graphical user interface having a different docking/undocking technique but a similar arrangement of components as the graphical user interface of FIG. 1.
Figure 13:
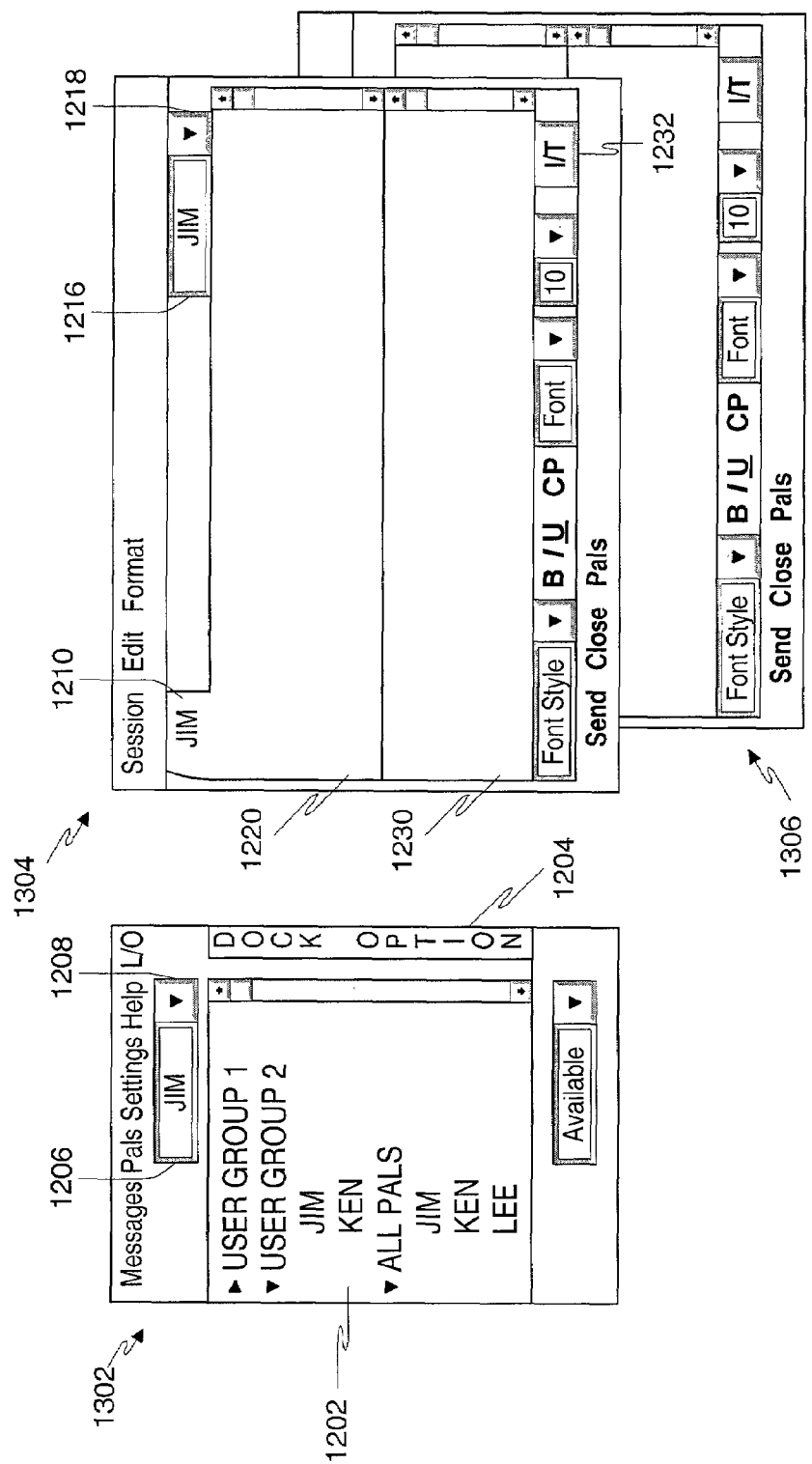
FIG. 13 is a pictorial representation of the graphical user interface of FIG. 12 in which the window panes have been undocked.

Another example of a graphical user interface is shown in FIGS. 12 and 13. The graphical user interface 1200 is consolidated into a single window pane set, the basic components of which include a pals panel 1202, a variable number of session tabs represented by session tabs 1210 and 1212, a message history panel 1220, and a composition panel 1230. A session command bar 1240 is also included in the graphical user interface 1200 to facilitate the issuance of commands and the designation of status. The components 1210, 1220, 1230 and 1240 relate to the engaged messaging session "JIM" that is represented by the session tab 1210 and identified in a small availability session name window pane 1206 and associated menu pull down button 1208, while the session tab 1212 indicates the non-engaged messaging session "KEN." Consolidation of these various panels to achieve a single window pane set greatly facilitates the user's tasks, but if desired the panels may be spun off to create respective window pane sets as shown in FIG. 13. The window pane set 1304 relates to the engaged messaging session "JIM" while the window pane set 1306 related to the non-engaged messaging session "KEN".

While the user interface of FIGS. 12 and 13 is similar to the user interface of FIG. 1, there are some differences of note. For example, a toggle switch 1204 marked "DOCK OPTION" is used to alternately dock and undock all window pane sets. The undocked window pane sets 1304 and 1306 may be repositioned as desired using, for example, mouse controls. The composition panel 1230 is toggled between a text composition and image composition by activation of an image/text switch 1232. The pals panel 1202 includes a number of user-defined user groups, and respective messaging sessions with all pals belonging to a group are initiated simply by selecting the user group heading to expand the group pal list. In the user interface of FIG. 12, for example, respective messaging sessions for Jim and Ken are initiated simply by expanding the "USER GROUP 2" heading. One or more individual messaging sessions may be initiated by selecting the "ALL PALS" heading to expand the list of all pals, and selecting one or more pals from the full list. The engaged messaging session may be changed from either the pals panel 1302 or the undocked window pane set 1304 for the engaged messaging session by pulling down a list of messaging session names with button 1208 or 1218, and selecting from the list.

Figure 14:
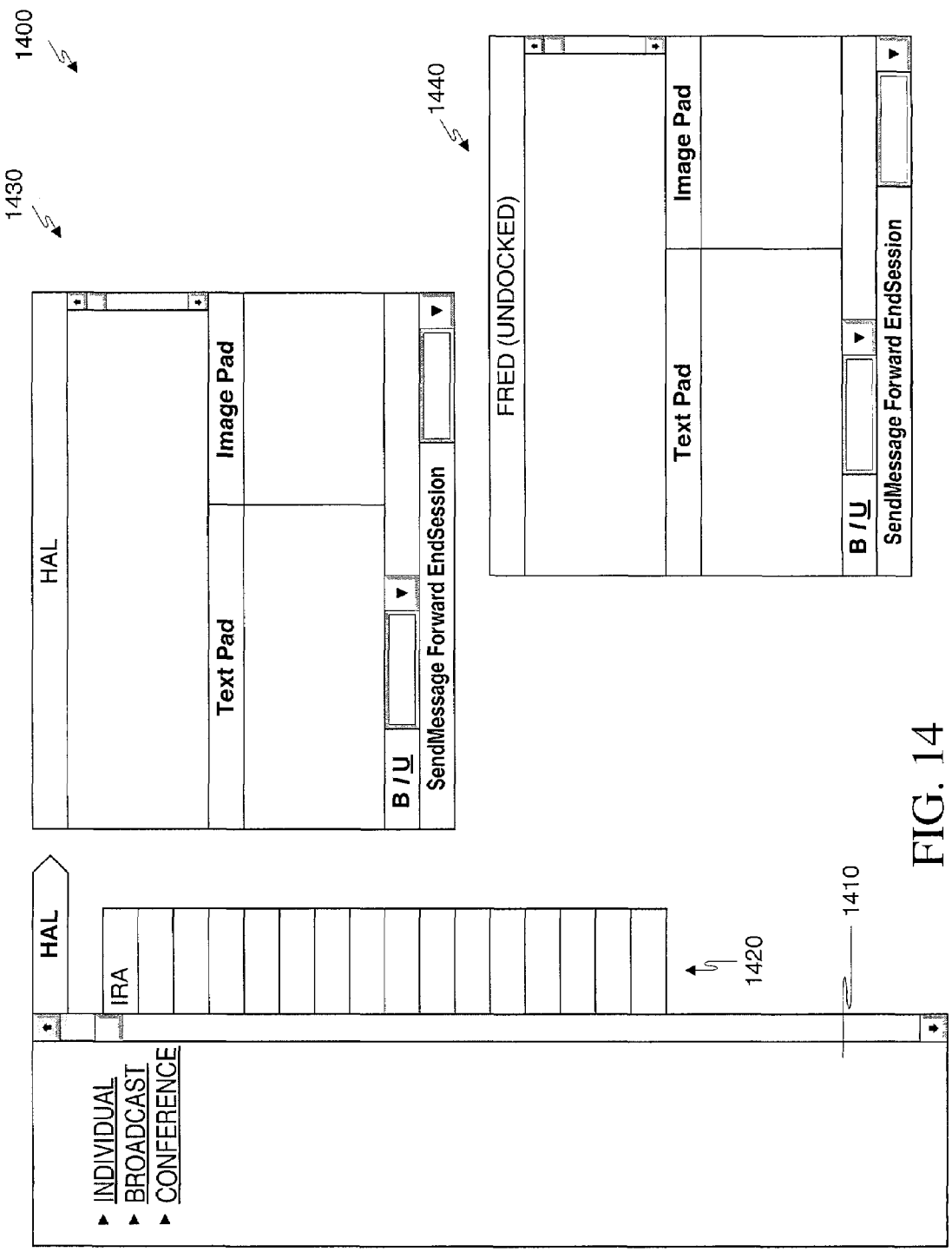
FIG. 14 is a pictorial representation of a graphical user interface having a different appearance but a similar arrangement of components as the graphical user interface of FIG. 1.

The graphical user interface for multiple messaging session management may be designed to have significantly different appearances and arrangements of components but still possess similar functionality. FIG. 14 is an example of a graphical user interface 1400 in which the graphical indexing elements for docked messaging sessions are placards arranged in a column 1420 docked to a pals list 1410. The engaged docked messaging session, the "Hal" messaging session in FIG. 14, is represented by a window pane set 1430 and indicated by the "Hal" placard being distinguished from the other placards in some suitable manner, illustratively by an arrowhead shape in FIG. 14. The "Team" and "Ira" messaging sessions are docked with the engaged "Hal" messaging session, as indicated by the presence of the "Team" and "Ira" placards. The docked messaging sessions are not docked with the pals list 1410, unlike the graphical user interface of FIG. 1. The "Fred" messaging session, which is undocked, is represented by the separate window pane set 1440. As the "Fred" messaging session is undocked, no placard labeled "Fred" appears in the placard column 1400.

Figure 15:
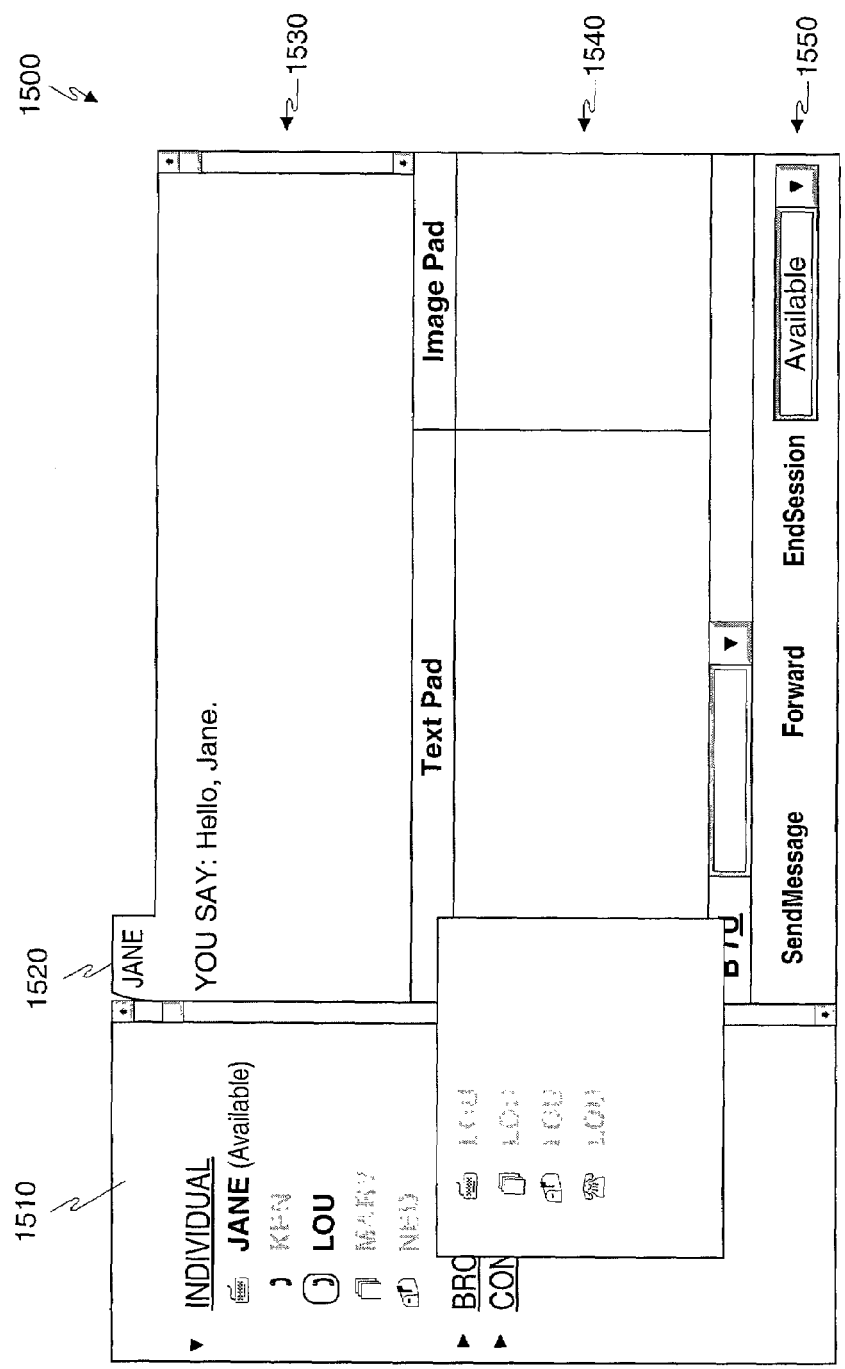
FIG. 15 is a pictorial representation of a graphical user interface having pals with user-selectable secondary device presences.

FIG. 15 shows how a user may select a secondary messaging option for a pal. A graphical user interface 1500 includes a pals panel 1510, a session tab 1520 for the engaged session "Jane," a message history panel 1530, a composition panel 1540, and a session command bar 1550. Intending to initiate a new session with Lou, the user clicks on the "Individual" heading which expands to reveal the user's pals list. The pal Jane has a computer browser presence (keyboard icon) and is online and available for instant message exchange. The pal Ken is offline and has designated his SMS mobile phone (handset icon) as an offline notification device. Availability is not indicated because the SMS phone does not provide such information. The pal Lou has a J2ME mobile telephone (handset in browser icon) which is turned on, i.e. is online. No availability is indicated because the particular J2ME client in question does not provide such information. The pal Mary has a fax machine or a fax account (paper icon) which is offline—traditional fax machines and fax accounts are indicated as being offline because typically the sender of a message to the machine or account cannot know whether the intended recipient is actively monitoring these devices. The pal Lou has an email account (post box icon) which is offline—the email account is indicated as being offline because typically the sender of a message to the account cannot know whether the intended recipient is logged into his or her email server or has notification service.

The user may wish to send a lengthy message to Lou. As the message is too long for a J2ME mobile phone, the user right clicks on the "Lou" pal in the pal panel 1510 to see if Lou has any "secondary" messaging options. Illustratively, a window 1560 pops up listing all available "secondary" messaging options for Lou, the option being listed in the pals panel 1510 being, illustratively, a "primary" messaging option based on any suitable criteria, such as, for example, the device which the pal is current using, the device which the pal most frequently uses, the device which the user designates as such, and so forth. The secondary pal options for Lou are a computer browser for instant message exchange (keyboard icon) which is offline (but which could be online), a fax machine (paper icon) which is offline, an email account (mailbox icon) which is offline, and an Internet phone option (telephone set icon) which is offline (but which could be online).

As the message is rather lengthy, the user may not wish to send it as an instant message to the computer browser but may instead wish to select either Lou's email account or Lou's facsimile device or account. Either choice initiates a new session so that Lou may compose a lengthy text message and send it. When Lou goes online with a graphical user interface such as 1500 to manage his multiple sessions and logs into his email service or into his online fax service, he receives the user's text and/or image message as a "non-engaged session with at least one unread message having just been received." When Lou clicks on the session tab for that non-engaged session, that session becomes engaged and he sees the message in the message history panel. If desired, the message may be represented as an icon such as, for example, a graphical fax file type icon, which the user can click to display in a separate large window. Alternatively, if Lou happens to be logged into his email service or into an online fax service that provides notification and also happens to be using a graphical user interface such as 1500 to manage his multiple sessions, he receives the user's text and/or image message promptly after it is sent as a "non-engaged session with at least one unread message having just been received." When Lou clicks on the session tab for that non-engaged session, that session becomes engaged and he sees the message in the message history panel.

The user may instead select another one of Lou's specified devices such as Lou's internet telephone, which initiates a new session having, illustratively, a microphone icon in the composition panel 1540. The user may click on this icon to dictate a message for Lou, which will be received by Lou when he goes online. The user may then wish to open a new session by selecting Lou's mobile phone device presence from the pals panel 1510 and inform Lou that the user has just left an important lengthy message on Lou's interment telephone. Assuming Lou goes online with a graphical user interface such as 1510 to manage his multiple sessions, he receives the user's internet phone message as a "non-engaged session with at least one unread message having just been received." When Lou clicks on the session tab for that non-engaged session, he sees a speaker icon in the message history panel, and may click on the icon to listen to the user's dictated message.

The user need not understand the limitations of each of a pal's messaging options to send the pal an instant message. In some instances, the server that manages the user's messaging session dynamically converts the instant message into a suitable form for the pal's messaging option, and in other instances detects any fundamental inconsistency and informs the user thereof. An example of the former is as follows. Assume that the user's messaging option is a computer browser, and the pal's messaging option is a personal data assistant ("PDA") device. If the user includes a large JPEG image file as part of an instant message to be sent to the pal, the server that manages the user's messaging session dynamically converts the JPEG file into a lower resolution and much smaller bit mapped file that can be displayed on the pal's PDA. If desired, the server that manages the user's messaging session may also notify the user of the conversion. An example of the later is as follows. Assume that the user's messaging option is a computer browser, and the pal's messaging option is an SMS device. If the user attempts to send an image file to the SMS device, the server that manages the user's messaging session notifies the user that the transmission has not occurred because of recipient device limitations.

A good example of a client-server system to which the techniques described herein are applicable is the Ecrio™ Rich Instant Messaging™ platform, which is available from Ecrio, Inc. of Cupertino, Calif. (www.ecrio.com). In this system, messages are dynamically formatted and rendered by the server for optimum readability when delivered to a particular digital device. Individual messages and sessions are archived on the server, and retrievable by the user from any supported client application.

Figure 16:
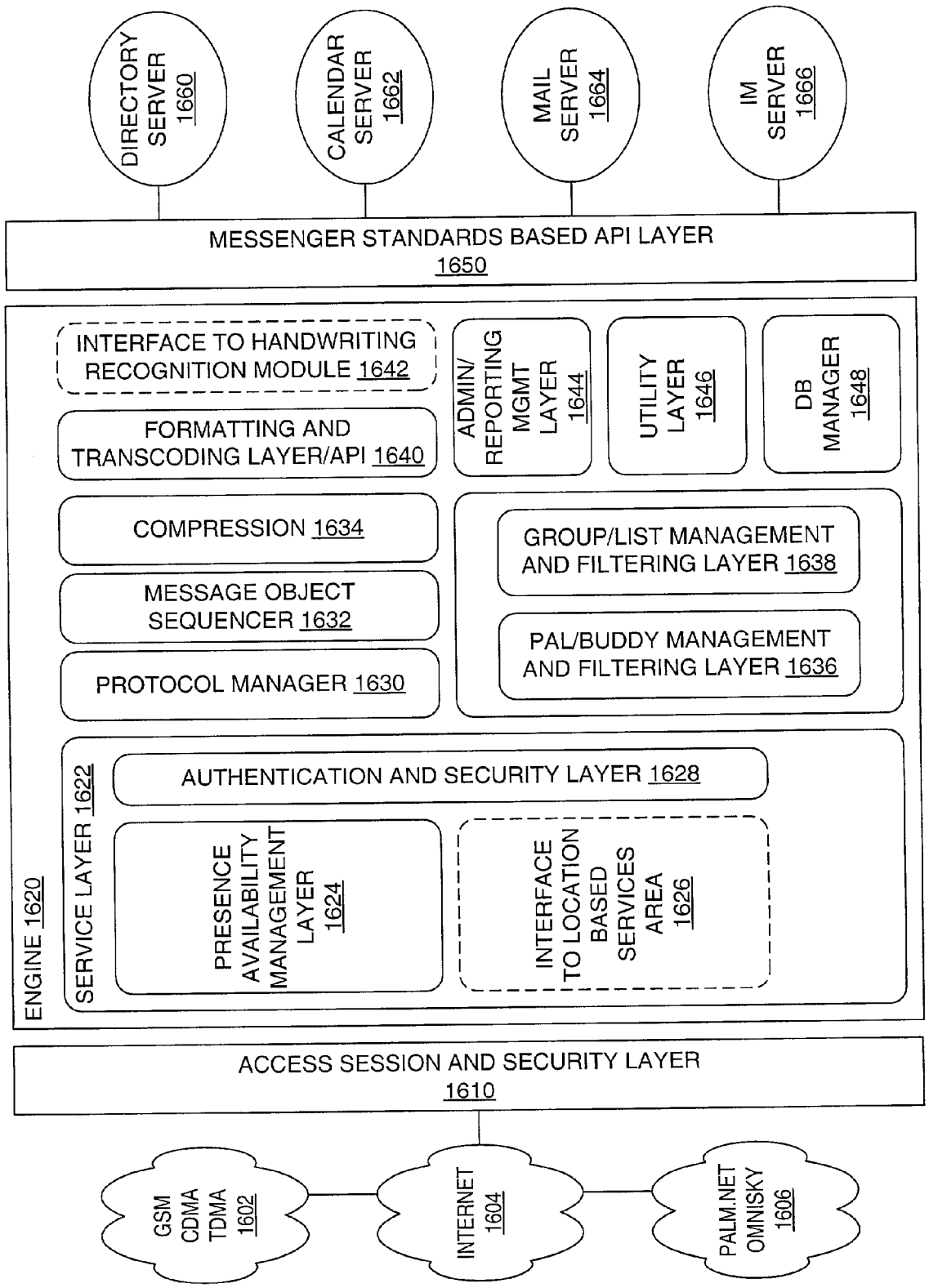
FIG. 16 is a block diagram of the internal architecture of an illustrative server based instant messaging host application suitable for use in a client-server based instant messaging system.

FIG. 16 shows the relevant internal architecture of the Ecrio Rich Instant Messaging platform. An engine 1620 known as the Ecrio™ Intelligent Delivery Engine™ system includes a service layer 1622, which in turn includes a presence availability management layer 1624, an interface to location based services area 1626, and an authentication and security layer 1628. The presence availability management layer 1624 determines how the user is logged in, e.g. through a formal user ID and password login or by having a mobile communications device that is ON and associated with the user. Dynamic device presence on WAP enabled phones is supported. The interface to location based services area 1626 provides an interface to external programs or modules which provide location information about the user. The programs and modules are typically operated by wireless carriers. Users gain access to the services provided by the service layer 1622 through the authentication and security layer 1628, which also functions to block unauthorized access.

The engine 1620 also provides standard instant messaging functions with a pal/buddy management and filtering layer 1636 and a group/list management and filtering layer 1638. Typical communications between the engine 1620 and the user's desktop computer via the internet 1604, or between the engine 1620 and the user's mobile communications device via a wireless ISP as represented by the wireless network 1602 for GSM, CDMA and TDMA communications and by the wireless Palm.net and Omnisky networks 1606, are handled by a protocol manager 1630, a message object sequencer 1632, a compression function 1634, and a formatting and transcoding layer/API 1640. An interface to handwriting recognition module 1642 provides the ability to access external handwriting recognition software for processing digitally captured handwriting. An administration/reporting management layer 1644 generates various reports, including reports for the wireless carriers. The utility layer 1646 performs various high level database functions, such as data filtering. The database manager 1648 provides various low level standard database functions.

A messenger standards based API layer 1650 allows for integration of third party services such as location-based service, content channels, stocks, weather, news, greeting card services, advertisement, and sponsorship placement. These services are represented by several third party servers in FIG. 14, namely the directory server 1650 using the Lightweight Directory Assistance Protocol ("LDAP") standard, the calendar server 1652 using the Internet Calendar ("ICAL") standard, the mail server 1654 using the Internet Message Access Protocol ("IMAP") standard, and the IM server 1656 using the Internet Engineering Task Force ("IETF") standard.

Since different types of messaging-enabled digital devices have different capabilities, the various graphical user interfaces described herein are generated for a particular type of digital device in a manner suitable for that type of device. Suitable techniques include, for example, generating the graphical user interface in the messaging-enabled digital device using pre-loaded or downloaded software, and generating the graphical user interface on a server and delivering the graphical user interface over a network. Suitable techniques are well know in the art.

The scope of our invention is set forth in the following claims. The description of the various embodiments set forth herein is illustrative of our invention and is not intended to limit the scope thereof. Variations and modifications of the embodiments disclosed herein will become apparent to those of ordinary skill in the art upon reading this patent document, and alternatives to and equivalents of the various elements of the embodiments will be known to those of ordinary skill in the art. These and other variations and modifications of the embodiments disclosed herein may be made without departing from the scope and spirit of the invention as set forth in the following claims.

What is claimed is:

1. A messaging-enabled digital device comprising:
    a messaging facility;
    a user input facility; and
    a graphical user interface comprising:
        a plurality of graphical indexing elements respectively representing a plurality of messaging sessions being handled by the messaging facility, one of the graphical indexing elements being selected in response to the user input facility and the messaging session represented by the selected graphical indexing element being engaged;
        a message history window pane displaying information from the engaged messaging session; and
        a composition window pane displaying information for the engaged messaging session;
    wherein a first one of the graphical indexing elements other than the selected graphical indexing element represents a non-engaged messaging session having no unread messages;
    wherein a second one of the graphical indexing elements other than the selected graphical indexing element represents a non-engaged messaging session having at least one unread message;
    wherein the message history window pane and the selected graphical indexing element are displace with a first characteristic to indicate the engaged messaging session;
    wherein the first graphical indexing element is displayed with a second characteristic different than the first characteristic;
    wherein the second graphical indexing element is displayed with a third characteristic different than the first and second characteristics; and
    wherein a third one of the graphical indexing elements other than the selected graphical indexing element represents a non-engaged messaging session having at least one unread and recently received message, the third graphical indexing element being displayed with a fourth characteristic different than the first, second and third characteristics.

2. A computer-readable medium carrying computer executable components for multiple messaging session management on a messaging-enabled digital device, the computer executable components comprising:
    a messaging component;
    a user input component;
    a window pane component for displaying a plurality of graphical indexing elements respectively representing a plurality of messaging sessions handled by the messaging component, one of the graphical indexing elements being selected in response to the user input component and the messaging session represented by the selected graphical indexing element being engaged;
    a component for displaying a message history window pane containing information from the engaged messaging session; and
    a component for displaying a composition window cane containing information for the engaged messaging session;
    wherein a first one of the graphical indexing elements other than the selected graphical indexing element represents a non-engaged messaging session having no unread messages;
    wherein a second one of the graphical indexing elements other than the selected graphical indexing element represents a non-engaged messaging session having at least one unread message;
    wherein the computer-executable components further comprise:
        a component for displaying the message history window pane and the selected graphical indexing element with a first characteristic to indicate the engaged messaging session;
        a component for displaying the first graphical indexing element with a second characteristic different than the first characteristic; and
        a component for displaying the second graphical indexing element with a third characteristic different than the first and second characteristics;
    wherein a third one of the graphical indexing elements other than the selected graphical indexing element represents a non-engaged messaging session having at least one unread and recently received message; and
    wherein the computer-executable components further comprise a component for displaying the third graphical indexing element with a fourth characteristic different than the first, second and third characteristics.

* * * * *